United States Patent
Iwata et al.

(10) Patent No.: US 12,060,481 B2
(45) Date of Patent: Aug. 13, 2024

(54) FLAME RETARDANT RESIN COMPOSITION, MOLDED BODY, INSULATED WIRE, CABLE AND OPTICAL FIBER CABLE USING THE SAME

(71) Applicant: Fujikura Ltd., Tokyo (JP)

(72) Inventors: Masayuki Iwata, Chiba (JP); Seiichi Taira, Chiba (JP); Tomonori Kondo, Chiba (JP); Shoichiro Nakamura, Chiba (JP)

(73) Assignee: Fujikura Ltd., Tokyo (JP)

( * ) Notice: Subject to any disclaimer, the term of this patent is extended or adjusted under 35 U.S.C. 154(b) by 770 days.

(21) Appl. No.: 17/050,735

(22) PCT Filed: Oct. 16, 2018

(86) PCT No.: PCT/JP2018/038538
§ 371 (c)(1),
(2) Date: Oct. 26, 2020

(87) PCT Pub. No.: WO2019/207819
PCT Pub. Date: Oct. 31, 2019

(65) Prior Publication Data
US 2021/0122912 A1      Apr. 29, 2021

(30) Foreign Application Priority Data
Apr. 27, 2018    (WO) .................. PCT/JP2018/017351

(51) Int. Cl.
C08L 53/00    (2006.01)
G02B 6/44     (2006.01)
H01B 3/44     (2006.01)
H01B 7/295    (2006.01)

(52) U.S. Cl.
CPC ............ C08L 53/00 (2013.01); G02B 6/4436 (2013.01); H01B 3/441 (2013.01); H01B 7/295 (2013.01)

(58) Field of Classification Search
None
See application file for complete search history.

(56) References Cited

U.S. PATENT DOCUMENTS

| | | | | |
|---|---|---|---|---|
| 4,174,343 A * | 11/1979 | Hardy | ............ | C07F 9/657181 987/44 |
| 4,257,931 A | 3/1981 | Granzow | | |
| 5,246,783 A * | 9/1993 | Spenadel | ............ | H01B 3/441 428/930 |
| 6,496,629 B2 * | 12/2002 | Ma | ............ | G02B 6/4427 385/113 |
| 6,714,707 B2 * | 3/2004 | Rossi | ............ | G02B 6/4429 385/109 |
| 2003/0100659 A1 * | 5/2003 | Tasaka | ............ | C08L 23/04 524/487 |
| 2011/0257310 A1 * | 10/2011 | Butz | ............ | C08K 5/357 252/609 |
| 2012/0261163 A1 * | 10/2012 | Tai | ............ | C08L 23/16 174/136 |
| 2014/0288217 A1 * | 9/2014 | Hatanaka | ............ | C08K 5/52 524/100 |

(Continued)

FOREIGN PATENT DOCUMENTS

EP    2634217 A1    9/2013
JP    H05-132606 A    5/1993

(Continued)

OTHER PUBLICATIONS

Phos-Chek P/30 data sheet, Aug. 2006. (Year: 2006).*

(Continued)

*Primary Examiner* — Christopher M Rodd
(74) *Attorney, Agent, or Firm* — Osha Bergman Watanabe & Burton LLP

(57) ABSTRACT

A flame retardant resin composition includes a polyolefin resin, a phosphate compound, and an organic phosphorus compound. The phosphate compound includes a salt of a phosphoric acid represented by the following formula:

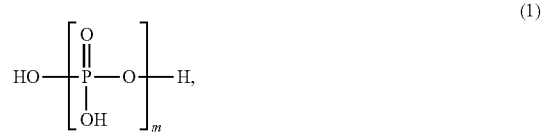

(1)

where m represents an integer of 1 to 100, and an amine compound containing an amino group in a molecule, and the organic phosphoric compound (C) is represented by the following formula:

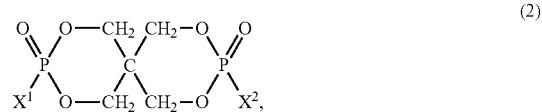

(2)

where $X^1$ and $X^2$ are the same or different, and are represented by the following formula:

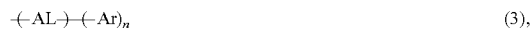

(3), where AL is a branched or linear aliphatic hydrocarbon group having 1 to 5 carbon atoms, Ar is a phenyl group, a naphthyl group or an anthryl group which may include a substituted group, and bonds with an optional carbon atom in the AL, and n indicates an integer of 1 to 3.

15 Claims, 3 Drawing Sheets

(56) References Cited

U.S. PATENT DOCUMENTS

2015/0133571 A1    5/2015    Claessen et al.

FOREIGN PATENT DOCUMENTS

| JP | 2009074030 A | 4/2009 |
| JP | 2012-092230 A | 5/2012 |
| JP | 5243653 B1 | 7/2013 |
| JP | 2014065822 A | 4/2014 |
| JP | 2015525252 A | 9/2015 |
| JP | 2017031351 A | 2/2017 |
| JP | 2018095832 A | 6/2018 |

OTHER PUBLICATIONS

International Preliminary Report on Patentability issued in corresponding International application No. PCT/JP2018/038538 mailed Nov. 5, 2020 (15 pages).
Office Action issued in counterpart Chinese Patent Application No. 201880092285.2 dated Jul. 29, 2022, with translation (16 pages).
Extended European Search Report issued in corresponding European Patent Application No. 18916345.4 dated May 3, 2021 (6 pages).

* cited by examiner

FLAME RETARDANT RESIN COMPOSITION, MOLDED BODY, INSULATED WIRE, CABLE AND OPTICAL FIBER CABLE USING THE SAME

TECHNICAL FIELD

One or more embodiments relate to a flame retardant resin composition, a molded body, an insulated wire, a cable and an optical fiber cable using the same.

BACKGROUND

In recent years, in OA equipment such as a television, a personal computer or a printer, a building material, an automobile interior material, an electronic component, a metal cable or an optical fiber cable, requests for flame retardancy has become stricter from the viewpoint of fire prevention. Therefore, materials having high flame retardancy are getting used for them.

As a material having such high flame retardancy, a flame retardant resin composition obtained by blending a phosphate compound to a polyolefin resin is known (see the patent document 1 mentioned below).

The flame retardant resin composition described in the above-mentioned patent document 1 exhibits excellent flame retardancy. However, the flame retardant resin composition described in the above-mentioned patent document 1 has room for improvement in terms of processability.

For this reason, a flame retardant resin composition capable of improving processability while securing excellent flame retardancy has been required.

PATENT LITERATURE

Patent document 1: JPA 2014-65822

SUMMARY

One or more embodiments of the invention provide a flame retardant resin composition capable of improving processability while securing excellent flame retardancy, a molded body, an insulated wire, a cable and an optical fiber cable using the same.

SUMMARY

One or more embodiments are a flame retardant resin composition in which a specific phosphate compound and a specific organic phosphorus compound are blended to a polyolefin resin in specific ratios, respectively.

One or more embodiments are a flame retardant resin composition including a polyolefin resin (A), a phosphate compound (B) and an organic phosphorus compound (C), in which the phosphate compound (B) includes a salt of a phosphoric acid represented by the following general formula (1) and an amine compound containing at least one amino group in a molecule, and the organic phosphoric compound (C) is represented by the following general formula (2).

[Chemical formula 1]

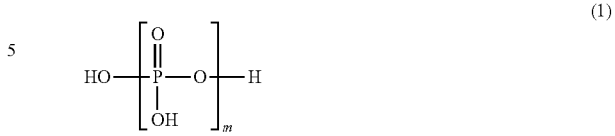

(in the general formula (1), m represents an integer of 1 to 100.)

[Chemical formula 2]

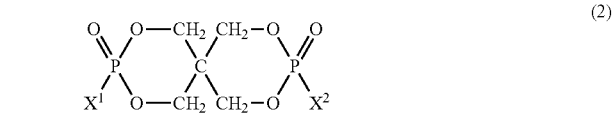

(in the general formula (2), $X^1$ and $X^2$ are the same or different and are represented by the following general formula (3).)

[Chemical formula 3]

(in the general formula (3), AL is a branched or linear aliphatic hydrocarbon group having 1 to 5 carbon atoms, Ar is a phenyl group, a naphthyl group or an anthryl group which may include a substituted group, and bonds with an optional carbon atom in the AL, and n indicates an integer of 1 to 3.)

According to the flame retardant resin composition, processability can be improved while securing excellent flame retardancy.

In addition, the inventors of one or more embodiments presume the reason why excellent flame retardancy can be secured by the flame retardant resin composition of one or more embodiments as follows.

That is, the phosphate compound contains a salt of the phosphoric acid represented by the general formula (1) and an amine compound having at least one amino group in the molecule, and forms a dense foamed heat insulating layer at the time of combustion of the flame retardant resin composition. Therefore, combustion of the polyolefin resin is suppressed, and self-extinguishing property is imparted to the flame retardant resin composition. Here, when other flame retardants such as metal hydroxides or silicone based compounds are used in combination with the phosphate compound, formation of the dense foamed heat insulating layer is inhibited. In contrast, the organic phosphorus compound represented by the general formula (2) is considered to suppress the combustion of the polyolefin resin by a radical trap action in a solid phase. Moreover, since the organic phosphorus compound has a phosphonic acid compound in the skeleton, it is considered that the organic phosphorus compound is compatible with a flame retardant composed of the phosphate compound. Further, since the organic phosphorus compound has a pentaerythritol ester having an action accelerating carbonization at the time of combustion in the skeleton, it is considered to be difficult to inhibit formation of a dense foamed heat insulating layer unlike other flame retardants such as metal hydroxides or silicone compounds. Moreover, in the flame retardant resin composition of one or more embodiments, it is considered that a temperature expressing the radial trap action and a formation temperature of the dense foamed heat insulating layer are close to each other. From the above, it is considered that excellent flame retardancy is secured by the flame retardant resin composition of one or more embodiments.

Further, the reason why the processability is improved by the flame retardant resin composition of one or more embodiments is not clear, but the present inventors presumes as follows.

That is, since in the organic phosphorus compound a molecular structure is a planar structure and steric hindrance is small, it is considered that by using the phosphate compound and the organic phosphorus compound in combination the fluidity of the flame retardant resin composition can be improved when the flame retardant resin composition is processed. Therefore, it is considered that the processability of the flame retardant resin composition can be improved.

In the flame retardant resin composition, it is preferable that the phosphate compound (B) be blended in a ratio of more than 0 part by mass and 120 parts by mass or less to 100 parts by mass of the polyolefin resin (A).

In this case, more excellent flame retardancy can be obtained in the flame retardant resin composition in comparison with a case where the blending ratio of the phosphate compound to 100 parts by mass of the polyolefin resin (A) is 0 part by mass. Further, processability can be further improved in comparison with a case where the blending ratio of the phosphate compound to 100 parts by mass of the polyolefin resin (A) exceeds 120 parts by mass.

In the flame retardant resin composition, the organic phosphorus compound (C) is preferably blended in a ratio of more than 0 part by mass and 50 parts by mass or less to 100 parts by mass of the polyolefin resin (A).

In this case, processability and flame retardancy of the flame retardant resin composition can be further improved in comparison with a case where the blending ratio of the organic phosphorus compound (C) to 100 parts by mass of the polyolefin resin (A) is 0 part by mass or more than 50 parts by mass.

In the flame retardant resin composition, the organic phosphorus compound (C) is preferably blended in a ratio of 5 parts by mass or more and 40 parts by mass or less to 100 parts by mass of the polyolefin resin (A).

In the flame retardant resin composition, $x^1$ and $x^2$ in the general formula (2) are preferably benzyl groups.

In this case, compared with a case where $x^1$ and $x^2$ in the general formula (2) are not benzyl groups, more excellent processability can be obtained in the flame retardant resin composition.

In the flame retardant resin composition, it is preferable that m in the general formula (1) be 1 to 2, and the amine compound be composed of an amine compound containing a triazine ring, a mixture of an amine compound containing a piperazine ring and an amine compound containing a triazine ring, ammonia, or guanidyl urea.

In this case, flame retardancy of the flame retardant resin composition is effectively improved.

In the flame retardant resin composition, the amine compound is preferably composed of a mixture of an amine compound containing a piperazine ring and an amine compound containing a triazine ring.

In this case, flame retardancy of the flame retardant resin composition is further improved in comparison with a case where the amine compound is not composed of the above-mentioned mixture.

The flame retardant resin composition preferably further contains a fluorine based drip preventing agent (D).

In this case, resin sagging (dripping) at the time of combustion of the flame retardant resin composition can be prevented.

In the flame retardant resin composition, it is preferable that the fluorine based drip preventing agent (D) be further blended in a ratio of more than 0 part by mass and 5 parts by mass or less to 100 parts by mass of the polyolefin resin (A).

In this case, differently from the case where the blending ratio of the fluorine based drip preventing agent (D) to 100 parts by mass of the polyolefin resin (A) is 0 part by mass, the dripping prevention performance is exhibited, and in comparison with a case where the blending ratio of the fluorine based drip preventing agent (D) to 100 parts by mass of the polyolefin resin (A) exceeds 5 parts by mass, it is more sufficiently suppressed that the melt viscosity of the flame retardant resin composition becomes too high, and the processability of the flame retardant resin composition is further improved.

In the flame retardant resin composition, the polyolefin resin (A) preferably contains a polypropylene resin.

In this case, compared to a case where the polyolefin resin (A) does not contain a polypropylene resin, the flame retardant resin composition is more excellent in heat resistance.

In the flame retardant resin composition, the polyolefin resin (A) preferably contains an elastomer.

In this case, compared to a case where the polyolefin resin (A) does not contain an elastomer, the flame retardant resin composition is more excellent in impact resistance and cold resistance.

In the flame retardant resin composition, the content of the elastomer in the polyolefin resin (A) is preferably 60 mass % or less.

In this case, the flame retardancy of the flame retardant resin composition can be further improved in comparison with a case where the content of the elastomer in the polyolefin resin (A) exceeds 60 mass %.

In the flame retardant resin composition, the content of the elastomer in the polyolefin resin (A) is preferably less than 40 mass %.

In this case, the flame retardancy of the flame retardant resin composition can be further improved in comparison with a case where the content of the elastomer in the polyolefin resin (A) is 40 mass % or more.

In the flame retardant resin composition, the elastomer preferably contains an olefin-ethylene-butylene-olefin copolymer.

In this case, the impact resistance of the flame retardant resin composition can be further improved as compared with a case where the elastomer contains an elastomer other than the olefin-ethylene-butylene-olefin copolymer.

Further, one or more embodiments are a molded body containing the above-mentioned flame retardant resin composition.

This molded body includes the flame retardant resin composition capable of improving processability while securing excellent flame retardancy. Therefore, the molded body is applicable to various applications requiring both excellent flame retardancy and excellent processability.

Further, one or more embodiments are an insulated wire including a conductor and an insulating layer covering the conductor, wherein the insulating layer is composed of the flame retardant resin composition described above.

Since the insulated wire of one or more embodiments includes an insulating layer composed of a flame retardant resin composition capable of improving processability while securing excellent flame retardancy, the insulated wire can have excellent flame retardancy and good appearance.

Further, one or more embodiments are a cable including an insulated wire including a conductor and an insulating layer covering the conductor, and a covering layer covering the insulated wire, in which at least one of the insulating layer and the covering layer is composed of the flame retardant resin composition.

Since at least one of the insulating layer and the covering layer is composed of a flame retardant resin composition capable of improving processability while securing excellent flame retardancy, the cable of one or more embodiments can have excellent flame retardancy and good appearance.

Further, one or more embodiments are an optical fiber cable including an optical fiber and a covering part covering the optical fiber, in which the covering part includes an insulator covering the optical fiber, and the insulator is composed of the flame retardant resin composition described above.

Since the insulator covering the optical fiber of the covering part is composed of a flame retardant resin composition capable of improving processability while securing excellent flame retardancy, the optical fiber cable of one or more embodiments can have excellent flame retardancy and good appearance.

According to one or more embodiments, a flame retardant resin composition capable of improving processability while securing excellent flame retardancy, a molded body, an insulated wire, a cable, and an optical fiber cable using the same are provided.

DETAILED DESCRIPTION

Figure 1:
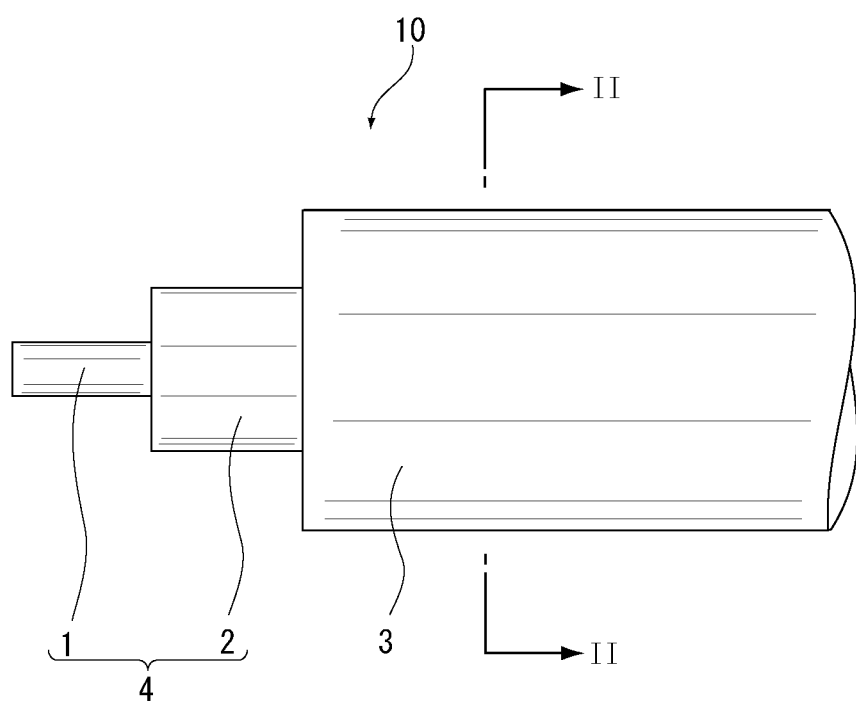
FIG. 1 is a partial side view illustrating a cable of one or more embodiments.

Hereinbelow, one or more embodiments will be described in detail.

<Flame Retardant Resin Composition>

The flame retardant resin composition of one or more embodiments contains a polyolefin resin (A) and a flame retardant, and the flame retardant includes a phosphate compound (B) and an organic phosphorus compound (C). Herein, the phosphate compound (B) includes a salt of a phosphorous acid represented by the following general formula (1) and an amine compound having at least one amino group in the molecule. The organic phosphorus compound (C) is represented by the following general formula (2).

[Chemical formula 4]

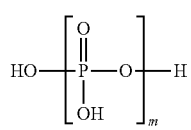

(1)

(in the general formula (1), m represents an integer of 1 to 100.)

[Chemical formula 5]

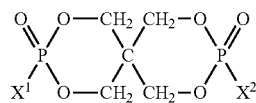

(2)

(in the general formula (2), $X^1$ and $X^2$ are the same or different, and are represented by the following general formula (3).)

[Chemical formula 6]

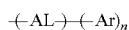

(3)

(in the general formula (3), AL is a branched or linear aliphatic hydrocarbon group having 1 to 5 carbon atoms. Ar is a phenyl group, a naphthyl group or an anthryl group which may include a substituted group, and bonds with an optional carbon atom in the AL. n indicates an integer of 1 to 3.)

According to the flame retardant resin composition of one or more embodiments, processability can be improved while securing excellent flame retardancy.

Hereinbelow, the polyolefin resin (A), the phosphate compound (B), and the organic phosphorus compound (C) will be described in detail.

(A) Polyolefin Resin

The polyolefin resin has a structural unit derived from an olefin (unsaturated aliphatic hydrocarbon) in the molecule and the polyolefin resin also includes a copolymer of an olefin and a non-olefin in addition to a homopolymer of an olefin and a copolymer of olefins different from each other. Specific examples of the polyolefin resin include polyethylene (PE), polypropylene (PP), an ethylene-ethyl acrylate copolymer (EEA), an ethylene-vinyl acetate copolymer (EVA), an ethylene-propylene copolymer, and an elastomer. They can be used alone or in combination of two or more thereof.

Examples of the elastomer include a block copolymer of an olefin and styrene such as a styrene-butadiene rubber (SBR), a styrene-ethylene-butadiene-styrene copolymer (SEBS copolymer), a styrene-propylene-butadiene-styrene copolymer (SPBS copolymer), a styrene-butadiene-styrene copolymer (SBS copolymer), a styrene-isoprene-styrene copolymer (SIS copolymer), hydrogenated products obtained by hydrogenating and reforming these block copolymer (a hydrogenated SBR, a hydrogenated SEBS copolymer, a hydrogenated SPBS copolymer, a hydrogenated SBS copolymer, a hydrogenated SIS copolymer), a polypropylene elastomer, and an olefin-ethylene-butylene-olefin copolymer such as an olefin crystal-ethylene-butylene-olefin crystal block copolymer (CEBC copolymer). They may be used alone or in combination of two or more thereof.

The polyolefin resin (A) preferably contains a polypropylene resin among the above-mentioned specific examples. In this case, the flame retardant resin composition is more excellent in heat resistance compared to a case where the polyolefin resin (A) does not contain a polypropylene resin.

The polyolefin resin (A) preferably contains the elastomer of the above-mentioned specific examples. In this case, the flame retardant resin composition is more excellent in impact resistance and cold resistance as compared with a case where the polyolefin resin (A) does not contain an elastomer.

The polyolefin resin (A) preferably further contains an elastomer in addition to the polypropylene resin. In this case, the flame retardant resin composition is more excellent in impact resistance and cold resistance as compared with a case where the polyolefin resin (A) does not contain an elastomer. Further, the flame retardant resin composition is more excellent in heat resistance compared to a case where the polyolefin resin (A) does not contain a polypropylene resin.

The elastomer preferably includes the olefin-ethylene-butylene-olefin copolymer. In this case, the impact resistance of the flame retardant resin composition can be further improved as compared with a case where the elastomer does not contain an olefin-ethylene-butylene-olefin copolymer. Herein, the olefin-ethylene-butylene-olefin copolymer is preferably the olefin crystal-ethylene-butylene-olefin crystal copolymer (CEBC copolymer). That is, in the olefin-ethylene-butylene-olefin copolymer, the olefin is preferably an olefin crystal, that is, the olefin has crystallinity. That is, in the olefin-ethylene-butylene-olefin copolymer, the olefin forms a block constituting a hard segment of the olefin-ethylene-butylene-olefin copolymer, and an ethylene-butadiene forms a block constituting a soft segment of the olefin-ethylene-butylene-olefin copolymer. Examples of the olefin include ethylene.

The content of the elastomer in the polyolefin resin (A) is not particularly limited, but is preferably 60 mass % or less. In this case, flame retardancy of the flame retardant resin composition can be further improved compared with a case where the content of the elastomer in the polyolefin resin (A) exceeds 60 mass %. Moreover, the content of the elastomer in the polyolefin resin (A) is more preferably less than 40 mass %. In this case, the flame retardancy of the flame retardant resin composition can be further improved in comparison with a case where the content of the elastomer in the polyolefin resin (A) is 40 mass % or more. The content of the elastomer in the polyolefin resin (A) is particularly preferably 20 mass % or less. In this case, flame retardancy of the flame retardant resin composition can be further improved as compared with a case where the content of the elastomer in the polyolefin resin (A) exceeds 20 mass %. However, the content of the elastomer in the polyolefin resin (A) is preferably 10 mass % or more. In this case, processability of the flame retardant resin composition can be further improved in comparison with a case where the content of the elastomer in the polyolefin resin (A) is less than 10 mass %.

(B) Phosphate Compound

The phosphate compound is a phosphoric acid amine salt compound containing a salt of the phosphoric acid represented by the general formula (1) and the amine compound having at least one amino group in the molecule. Herein, the "amino group" includes not only —NH$_2$ but also —NH—.

In the general formula (1), m is preferably 1 or 2. In this case, the flame retardant resin composition has more excellent flame retardancy as compared with a case where m is 3 or more.

Specific examples of the phosphoric acid represented by the general formula (1) include polyphosphoric acid such as pyrophosphoric acid or triphosphoric acid, and monophosphoric acid such as orthophosphoric acid.

Examples of the amine compound include an aliphatic diamine, an amine compound containing a piperazine ring, an amine compound containing a triazine ring, ammonia, and guanylurea. They may be used alone or in combination of two or more thereof.

As the aliphatic diamine, one having 1 to 15 carbon atoms is preferably used. Examples of such aliphatic diamines include N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N N',N'-diethylethylenediamine, 1,2-propanediamine, 1,3-propanediamine, tetramethylenediamine, pentamethylene diamine, hexamethylenediamine, 1,7-diaminoheptane, 1,8-diaminooctane, 1,9-diaminononane and 1,10-diaminodecane. They may be used alone or in combination of two or more thereof.

Examples of the amine compound containing a piperazine ring include piperazine, trans-2,5-dimethylpiperazine, 1,4-bis(2-aminoethyl) piperazine and 1,4-bis(3-aminopropyl) piperazine. They may be used alone or in combination of two or more thereof.

Examples of the amine compound containing a triazine ring include melamine, acetoguanamine, benzoguanamine, acrylic guanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, 2-amino-4,6-dimercapto-1,3,5-triazine, and melamine condensates such as melam or melem. They may be used alone or in combination of two or more thereof.

In a case where m in the general formula (1) representing phosphoric acid is 1 to 2, the amine compound is preferably composed of an amine compound containing a triazine ring, a mixture of an amine compound containing a piperazine ring and an amine compound containing a triazine ring, ammonia, or guanidyl urea. In this case, flame retardancy of the flame retardant resin composition is effectively improved.

The amine compound is preferably composed of a mixture of an amine compound containing a piperazine ring and an amine compound containing a triazine ring. In this case, the flame retardancy of the flame retardant resin composition is further improved in comparison with a case where the amine compound is not composed of the above-mentioned mixture. Herein, the content of the amine compound containing the piperazine ring in the mixture is preferably 20 to 55 mass %. In this case, more excellent flame retardancy can be obtained in the flame retardant resin composition in comparison with a case where the content of the amine compound containing the piperazine ring in the mixture is out of the above range.

The blending ratio of the phosphate compound (B) to 100 parts by mass of the polyolefin resin (A) is preferably more than 0 part by mass and 120 parts by mass or less. In this case, more excellent flame retardancy can be obtained in the flame retardant resin composition in comparison with a case where the blending ratio of the phosphate compound to 100 parts by mass of the polyolefin resin (A) is 0 part by mass. Further, the processability can be further improved in comparison with a case where the blending ratio of the phosphate compound to 100 parts by mass of the polyolefin resin (A) exceeds 120 parts by mass.

The blending ratio of the phosphate compound (B) is more preferably 5 parts by mass or more, even more preferably 15 parts by mass or more, and particularly preferably 20 parts by mass or more.

The blending ratio of the phosphate compound (B) to 100 parts by mass of the polyolefin resin (A) is more preferably 90 parts by mass or less. In this case, the processability of the flame retardant resin composition can be further improved in comparison with a case where the blending ratio of the phosphate compound (B) to 100 parts by mass of the polyolefin resin (A) exceeds 90 parts by mass. In order to improve processability while securing excellent flame retardancy, the blending ratio of the phosphate compound (B) to 100 parts by mass of the polyolefin resin (A) is more preferably 70 parts by mass or less. In addition, in order to particularly reduce the specific gravity of the flame retardant resin composition, the blending ratio of the phosphate compound (B) to 100 parts by mass of the polyolefin resin (A) is preferably 50 parts by mass or less, and more preferably 40 parts by mass or less.

(C) Organic Phosphorus Compound

The organic phosphorus compound (C) is represented by the general formula (2) as described above.

$X^1$ and $X^2$ in the general formula (2) are represented by the general formula (3). $X^1$ and $X^2$ may be the same as or different from each other.

The AL in the general formula (3) is a branched or linear aliphatic hydrocarbon group having 1 to 5 carbon atoms, and the number of carbon atoms of the aliphatic hydrocarbon group is preferably 1 or 2. Further, Ar in the general formula (3) is a phenyl group, a naphthyl group or an anthryl group which may have a substituted group, and is bonded to an arbitrary carbon atom in the AL. In particular, Ar is preferably a phenyl group. In the general formula (3), n is an integer of 1 to 3, and n is preferably 1 or 2.

$X^1$ and $X^2$ in the general formula (2) are preferably benzyl groups (phenylmethyl groups). In this case, compared with a case where $X^1$ and $X^2$ in the general formula (2) are not benzyl groups, more excellent processability can be obtained in the flame retardant resin composition.

The organic phosphorus compound (C) is preferably blended in a ratio of more than 0 part by mass and 50 parts by mass or less to 100 parts by mass of the polyolefin resin (A). In this case, the processability and flame retardancy of the flame retardant resin composition can be further improved in comparison with a case where the blending ratio of the organic phosphorus compound (C) to 100 parts by mass of the polyolefin resin (A) is 0 part by mass or more than 50 parts by mass.

The blending ratio of the organic phosphorus compound (C) to 100 parts by mass of the polyolefin resin (A) is preferably 1 part by mass or more. In this case, more excellent processability and flame retardancy can be obtained in the flame retardant resin composition in comparison with a case where the blending ratio of the organic phosphorus compound (C) to 100 parts by mass of the polyolefin resin (A) is less than 1 part by mass. The blending ratio of the organic phosphorus compound (C) to 100 parts by mass of the polyolefin resin (A) is more preferably 2.5 parts by mass or more, more preferably 5 parts by mass or more, and particularly preferably 10 parts by mass or more, from the viewpoint of further improving processability and flame retardancy of the flame retardant resin composition.

The blending ratio of the organic phosphorus compound (C) to 100 parts by mass of the polyolefin resin (A) is preferably 45 parts by mass or less. In this case, the processability and flame retardancy of the flame retardant resin composition can be further improved in comparison with a case where the blending ratio of the organic phosphorus compound (C) to 100 parts by mass of the polyolefin resin (A) exceeds 45 parts by mass. In addition, in order to further reduce the specific gravity of the flame retardant resin composition, the blending ratio of the organic phosphorus compound (C) to 100 parts by mass of the polyolefin resin (A) is more preferably 40 parts by mass or less, even more preferably 30 parts by mass or less, and particularly preferably 20 parts by mass or less.

From the viewpoint of preventing resin sagging (dripping) at the time of combustion of the flame retardant resin composition, the flame retardant resin composition of one or more embodiments preferably further contains a fluorine based drip preventing agent (D) in addition to the polyolefin resin (A), the phosphate compound (B) and the organic phosphorus compound (C). The fluorine based drip preventing agent (D) will be described in detail below.

(D) Fluorine Based Drip Preventing Agent

The fluorine based drip preventing agent (D) may be one which contain a fluorine-containing compound containing fluorine and can prevent resin sagging (dripping) at the time of combustion. Examples of such a fluorine-containing compound include a fluorine based resin such as polytetrafluoroethylene (hereinafter referred to as "PTFE"), polyvinylidene fluoride, and polyhexafluoropropylene. The fluorine-containing compound may be a non-modified fluorine-containing compound or a modified fluorine-containing compound, but is preferably modified. In this case, compared with a case where the fluorine-containing compound is not modified, the fluorine-containing compound is efficiently fibrillated and the dispersibility in the flame retardant resin composition is further improved. As a result, the drip preventing function of the drip preventing agent (D) can be further improved. Further, since the melt tension of the flame retardant resin composition is further increased, processability and moldability of the flame retardant resin composition can be further improved. Examples of the modified fluorine-containing compound include acid-modified polytetrafluoroethylene.

The fluorine based drip preventing agent (D) is preferably blended in a ratio of more than 0 part by mass and 5 parts by mass or less to 100 parts by mass of the polyolefin resin (A). In this case, differently from the case where the blending ratio of the fluorine based drip preventing agent (D) to 100 parts by mass of the polyolefin resin (A) is 0 part by mass, the dripping prevention performance is exhibited, and in comparison with a case where the blending ratio of the fluorine based drip preventing agent (D) to 100 parts by mass of the polyolefin resin (A) exceeds 5 parts by mass, it is more sufficiently suppressed that the melt viscosity of the flame retardant resin composition becomes too high and processability of the flame retardant resin composition is further improved.

The blending ratio of the fluorine based drip preventing agent (D) to 100 parts by mass of the polyolefin resin (A) is more preferably 0.2 parts by mass or more. In this case, more excellent flame retardancy can be obtained in the flame retardant resin composition in comparison with a case where the blending ratio of the fluorine based drip preventing agent (D) to 100 parts by mass of the polyolefin resin (A) is less than 0.2 parts by mass. Further, the blending ratio of the fluorine based drip preventing agent (D) to 100 parts by mass of the polyolefin resin (A) is more preferably 2 parts by mass or more.

The flame retardant resin composition may further contain an antioxidant, a heat deterioration inhibitor, an ultraviolet absorber, an ultraviolet deterioration inhibitor, an antifogging agent, a crosslinking agent, a foaming agent, a conductive filler, a heat dissipating agent, a coloring pigment, or the like as necessary, within a range that does not affect flame retardancy and processability.

The flame retardant resin composition can be obtained by kneading the polyolefin resin (A), the phosphate compound (B), the organic phosphoric acid compound (C), and optionally the fluorine based drip preventing agent (D). The kneading can be carried out by using a kneader capable of performing processing by providing heat necessary for melting the polyolefin resin (A) and shearing force required for dispersing the phosphate compound (B), the organic phosphoric acid compound (C) and optionally the drip preventing agent (D). As the kneading machine, for example, an open roll, a twin screw extruder, a banbury mixer, a pressure kneader, or the like can be used.

<Molded Body>

Next, the molded body of one or more embodiments will be described.

The molded body of one or more embodiments includes the flame retardant resin composition described above. This molded body includes the flame retardant resin composition capable of improving processability while securing excellent flame retardancy. Therefore, the molded body is applicable to various applications requiring both excellent flame retardancy and excellent processability. Examples of such applications include a back panel of a television, a capacitor case, an insulating film inside a keyboard, a panel in a heater, a flame retardant sheet of a building, an automobile dashboard, a packaging material, and a housing of a home appliance.

Examples of the shape of the molded body of one or more embodiments include a sheet shape, a plate shape, and the like, and the shape of the molded body is preferably a sheet shape.

The thickness of the molded body is not particularly limited, but the molded body of one or more embodiments can improve processability while securing excellent flame retardancy even when the thickness of the molded body is 5 mm or less.

The molded body can be obtained by molding the flame retardant resin composition by using, for example, an extrusion molding method, an injection molding method, a vacuum molding method, a press molding method, or the like. The molded body may be composed of a flame retardant resin composition alone, or may be formed by combining a flame retardant resin composition with a reinforcing material such as glass cloth or paper according to applications.

<Cable>

Figure 2:
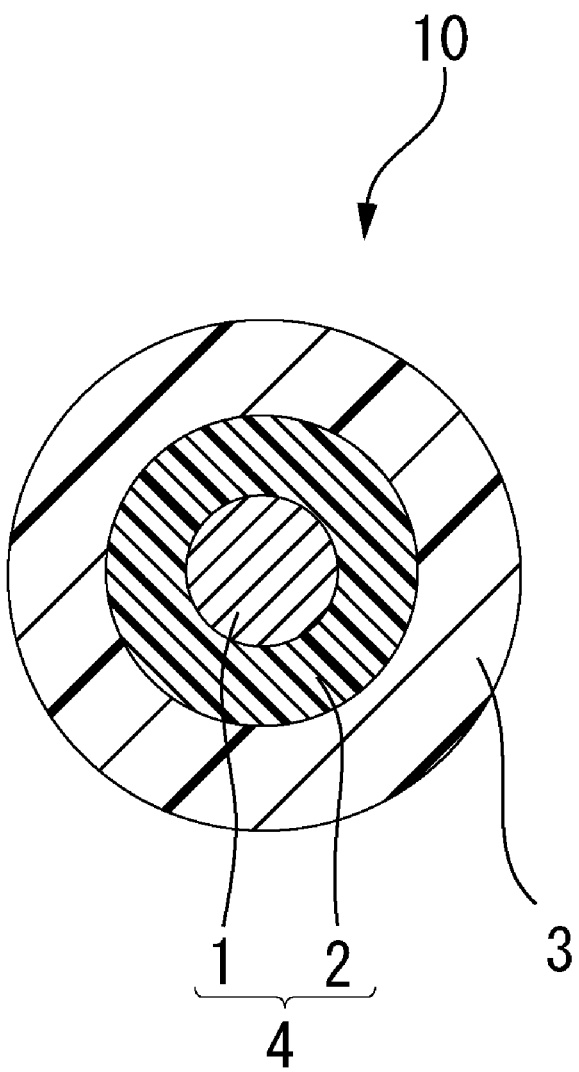
FIG. 2 is a cross-sectional view taken along line II-II of FIG. 1.

Next, the cable of one or more embodiments will be described with reference to FIG. 1 and FIG. 2. FIG. 1 is a partial side view illustrating a cable according to one or more embodiments. FIG. 2 is a cross-sectional view taken along line II-II of FIG. 1.

As illustrated in FIG. 1 and FIG. 2, the cable 10 includes an insulated wire 4 and a tubular covering layer 3 covering the insulated wire 4. The insulated wire 4 includes a conductor 1 and a tubular insulating layer 2 covering the conductor 1.

Herein, the tubular insulating layer 2 and the covering layer 3 are composed of the flame retardant resin composition described above, and the flame retardant resin composition described above can improve processability while securing excellent flame retardancy. Therefore, the insulating layer 2 and the covering layer 3 composed of the flame retardant resin composition can have excellent flame retardancy and good appearance. Accordingly, the cable 10 can have excellent flame retardancy and good appearance.

(Conductor)

The conductor 1 may be composed of only one strand, or may be formed by bundling a plurality of strands. And the conductor 1 is not particularly limited in terms of the diameter or material of the conductor, and can be suitably determined according to the application. As the material of the conductor 1, for example, copper, aluminum, or an alloy containing them is preferable, but a conductive substance such as a carbon material can be suitably used.

(Covering Layer)

The covering layer 3 is a so-called sheath and protects the insulating layer 2 from physical or chemical damage.

<Optical Fiber Cable>

Figure 3:
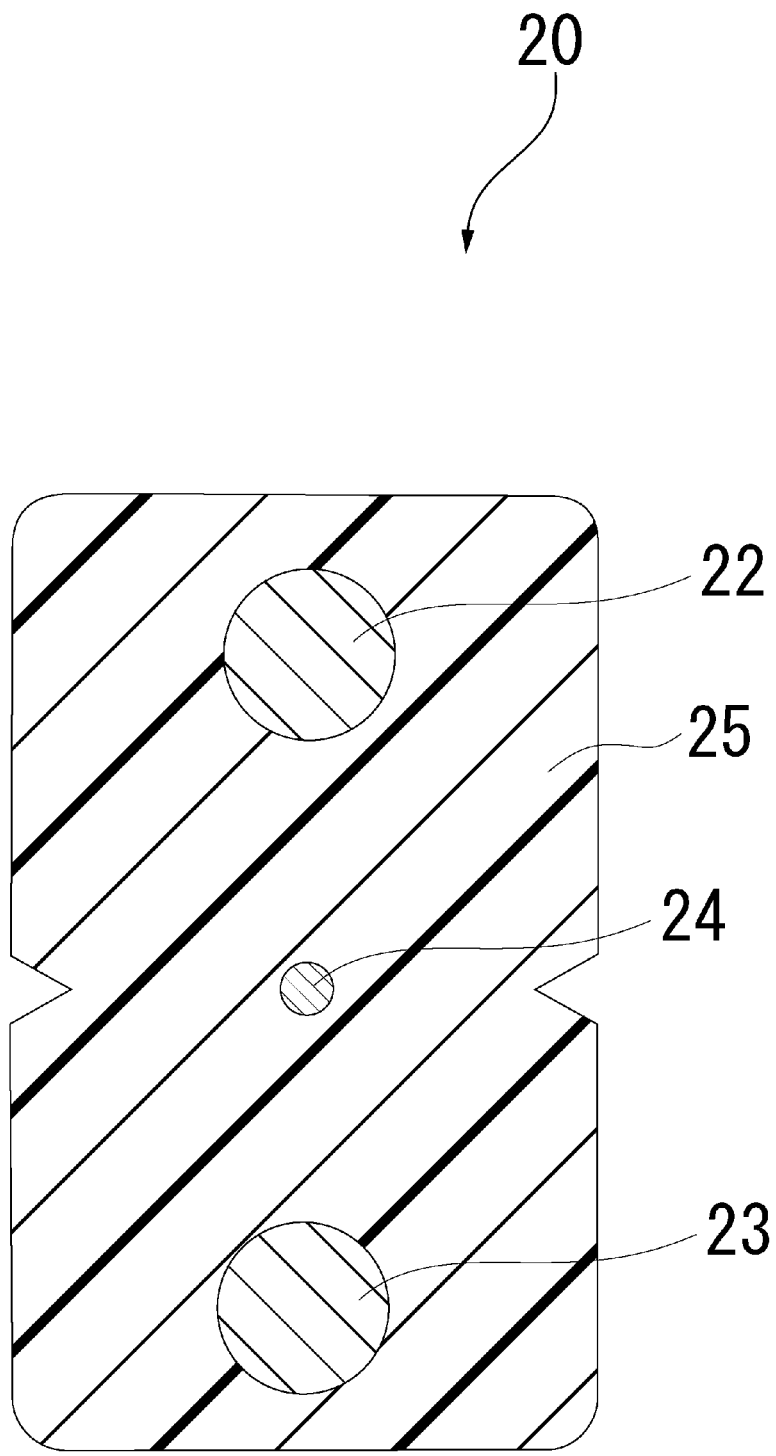
FIG. 3 is a cross-sectional view illustrating an optical fiber cable of one or more embodiments.

Next, an optical fiber cable of one or more embodiments will be described with reference to FIG. 3. FIG. 3 is a cross-sectional view illustrating an optical fiber cable of one or more embodiments.

As illustrated in FIG. 3, the optical fiber cable 20 includes two tension members 22, 23, an optical fiber 24, and a covering part 25 covering these. Herein, the optical fiber 24 is provided so as to penetrate the covering part 25. Herein, the covering part 25 is composed of an insulator covering the optical fiber 24, and the insulator is composed of the flame retardant resin composition constituting the insulating layer 2 and the covering layer 3 of the insulated wire 4 in the above-mentioned embodiment. In addition, the insulator constituting the covering part 25 may directly cover the optical fiber 24 (see FIG. 3) or may indirectly cover the optical fiber.

Herein, the covering part 25 is composed of the flame retardant resin composition described above, and the flame retardant resin composition described above can improve processability while securing excellent flame retardancy. Therefore, the covering part 25 composed of the flame retardant resin composition can have excellent flame retardancy and good appearance. Accordingly, the optical fiber cable 20 can have excellent flame retardancy and good appearance.

The present invention is not limited to the above-mentioned one or more embodiments. For example, in the above-mentioned one or more embodiments, the cable 10 having one insulated wire 4 is used as a cable. However, the cable of one or more embodiments is not limited to a cable having one insulated wire 4, and may be a cable having two or more insulated wires 4 inside the covering layer 3. A resin part made of polypropylene or the like may be provided between the covering layer 3 and the insulated wire 4.

Further, in the above-mentioned one or more embodiments, the insulating layer 2 and the covering layer 3 of the insulated wire 4 are composed of the above-mentioned flame retardant resin composition. However, the insulating layer 2 is composed of an ordinary insulating resin, and only the covering layer 3 may be composed of the above-mentioned flame retardant resin composition.

In addition, in the optical fiber cable 20, the covering part 25 is composed of the insulator, but the covering part 25 may further include the covering body covering the insulator. Herein, the covering body may or may not be composed of the flame retardant resin composition constituting the insulating layer 2 and the covering layer 3 of the insulated wire 4 in the above-mentioned embodiment. However, the covering body is preferably composed of the flame retardant resin composition constituting the insulating layer 2 and the covering layer 3 of the insulated wire 4 in the above-mentioned embodiment.

Further, in the above-mentioned one or more embodiments, the optical fiber cable 20 has tension members 22, 23, but in the optical fiber cable of one or more embodiments, the tension member is not necessarily required, and can be omitted.

EXAMPLES

Hereinafter, one or more embodiments will be described more specifically with reference to the following Examples, but one or more embodiments are not limited to the following Examples.

Examples 1 to 112 and Comparative Examples 1 to 46

A polyolefin resin (A), a phosphate compound (B), an organic phosphorus compound (C), and a fluorine based drip preventing agent (D) were blended in the blending amounts shown in Tables 1 to 22, and kneaded at 180° C. using an open roll to obtain flame retardant resin compositions. In addition, in Tables 1 to 22, the unit of the blending amount of each blending component is "mass part."

Specifically, as the polyolefin resin (A), the phosphate compound (B), the organic phosphorus compound (C) and the drip preventing agent (D), the following ones were used.

(A) Polyolefin Resin
- (A1) A block copolymer of ethylene and propylene (b-EP-1 (hereinafter referred to as "b-PP-1"), manufactured by Prime Polymer Co., Ltd, MFR=3.5 g/10 min)
- (A2) A block copolymer of ethylene and propylene (b-EP-2 (hereinafter referred to as "b-PP-2"), manufactured by Prime Polymer Co., Ltd, MFR=30 g/10 min)
- (A3) Homo polypropylene (h-PP, manufactured by Prime Polymer Co., Ltd)
- (A4) High density polyethylene (HDPE, manufactured by Japan Polyethylene Corporation)
- (A5) Linear low density polyethylene (LLDPE, manufactured by Sumitomo Chemical Company Limited)
- (A6) Modified polypropylene resin (PP elastomer, manufactured by Mitsui Chemicals, Inc.)
- (A7) Hydrogenated styrene-butadiene rubber (hydrogenated SBR, manufactured by JSR Corporation)
- (A8) Olefin crystal-ethylene-butylene-olefin crystal block copolymer (CEBC copolymer, manufactured by JSR Corporation)

(B) Phosphate Compound
- (B1) Flame retardant composed of piperazine pyrophosphate and melamine pyrophosphate
- (B2) Flame retardant composed of piperazine pyrophosphate, melamine pyrophosphate and zinc oxide
- (B3) Flame retardant composed of melamine pyrophosphate
- (B4) Flame retardant composed of melamine orthophosphate
- (B5) Flame retardant composed of melamine polyphosphate
  The polyphosphate is a salt of polyphosphoric acid and melamine, and the polyphosphoric acid is phosphoric acid having m of 3 or more in the general formula (1).
- (B6) Flame retardant composed of ammonium polyphosphate The ammonium polyphosphate is a salt of polyphosphoric acid and ammonia, and the polyphosphoric acid is phosphoric acid having m of 3 or more in the general formula (1).
- (B7) Flame retardant composed of guanylurea phosphate
  The guanylurea phosphate is a salt of phosphoric acid and guanylurea, and the phosphoric acid is phosphoric acid having m of one in the general formula (1).
- (B8) Flame retardant composed of melamine-melam-melem polyphosphate
  The melamine-melam-melem polyphosphate is a salt (double salt) of polyphosphoric acid with melamine, melam and melem, and the polyphosphoric acid is phosphoric acid having m of 3 or more in the general formula (1).

(C) Organic Phosphorus Compound
- (C1) Phosphonic acid-pentaerythritol ester based flame retardant (flame retardant in which $X^1$ and $X^2$ are benzyl groups (phenylmethyl groups) in the general formula (2))
- (C2) Phosphonic acid-pentaerythritol ester based flame retardant (flame retardant in which $X^1$ and $X^2$ are phenylethyl groups in the general formula (2))
- (C3) Phosphonic acid-pentaerythritol ester based flame retardant (flame retardant in which $X^1$ and $X^2$ are phenylpropyl groups in the general formula (2))
- (C4) Phosphonic acid-pentaerythritol ester based flame retardant (flame retardant in which $X^1$ and $X^2$ are phenylbutyl groups in the general formula (2))
- (C5) Phosphonic acid-pentaerythritol ester based flame retardant (flame retardant in which $X^1$ and $X^2$ are phenylpentyl groups in the general formula (2))
- (C6) Phosphonic acid-pentaerythritol ester based flame retardant (flame retardant in which $X^1$ and $X^2$ are phenylisopropyl groups in the general formula (2))
- (C7) Phosphonic acid-pentaerythritol ester based flame retardant (flame retardant in which $X^1$ and $X^2$ are naphthylmethyl groups in the general formula (2))
- (C8) Phosphonic acid-pentaerythritol ester based flame retardant (flame retardant which $X^1$ and $X^2$ are in anthrylmethyl groups in the general formula (2))
- (C9) Phosphonic acid-pentaerythritol ester based flame retardant (flame retardant in which $X^1$ is a phenylmethyl group, and $X^2$ is a naphthylmethyl group in the general formula (2))

(D) Fluorine Based Drip Preventing Agent
- (D1) Acid-modified polytetrafluoroethylene particles (modified PTFE)
- (D2) Non-modified polytetrafluoroethylene particles (non-modified PTFE)

TABLE 1

|   |   | Comparative Example 1 | Example 1 | Example 2 | Example 3 | Example 4 | Example 5 |
|---|---|---|---|---|---|---|---|
| (A) Polyolefin resin | (A1) b-PP-1 | 90 | 90 | 90 | 90 | 90 | 90 |
|   | (A2) b-PP-2 |   |   |   |   |   |   |
|   | (A3) h-PP |   |   |   |   |   |   |
|   | (A4) HDPE |   |   |   |   |   |   |
|   | (A5) LLDPE |   |   |   |   |   |   |

TABLE 1-continued

|  |  |  |  |  |  |  |  |
|---|---|---|---|---|---|---|---|
|  | (A6) PP elastomer | 10 | 10 | 10 | 10 | 10 | 10 |
|  | (A7) Hydrogenated SBR |  |  |  |  |  |  |
|  | (A8) CEBC copolymer |  |  |  |  |  |  |
| (B) Phosphate compound | (B1) Piperazine pyrophosphate + Melamine pyrophosphate | 5 | 5 | 5 | 5 | 5 | 5 |
|  | (B2) Piperazine pyrophosphate + Melamine pyrophosphate + Zinc oxide |  |  |  |  |  |  |
| (C) Organic phosphorous compound | (C1) Phosphonic acid-pentaerythritol ester based flame retardant ($X^1$, $X^2$: Benzyl group (phenylmethyl group)) | 0 | 0.1 | 1 | 2.5 | 5 | 10 |
| (D) Fluorine based drip preventing agent | (D1) Modified PTFE | 2 | 2 | 2 | 2 | 2 | 2 |
| Flame retardancy | UL94 vertical burning test | Burned down (5 mm) | V-1 (5 mm) | V-0 (5 mm) | V-0 (5 mm) | V-0 (5 mm) | V-0 (5 mm) |
|  | UL94 5 V test | — | — | Burned down | 5VB | 5VA | 5VA |
| Processability | MFR (g/10 min) | 4.7 | 4.8 | 4.9 | 5.0 | 5.2 | 5.4 |
|  | MFR as a basis for calculating increase rate of MFR (g/10 min) | 4.7 (Comparative Example 1) | 4.7 (Comparative Example 1) | 4.7 (Comparative Example 1) | 4.7 (Comparative Example 1) | 4.7 (Comparative Example 1) | 4.7 (Comparative Example 1) |
|  | Increase rate of MFR (%) | 0 | 2.1 | 4.1 | 6.0 | 9.6 | 13.0 |
|  | Specific gravity | 0.96 | 0.96 | 0.96 | 0.97 | 0.97 | 0.98 |

|  |  | Example 6 | Example 7 | Example 8 |
|---|---|---|---|---|
| (A) Polyolefin resin | (A1) b-PP-1 | 90 | 90 | 90 |
|  | (A2) b-PP-2 |  |  |  |
|  | (A3) h-PP |  |  |  |
|  | (A4) HDPE |  |  |  |
|  | (A5) LLDPE |  |  |  |
|  | (A6) PP elastomer | 10 | 10 | 10 |
|  | (A7) Hydrogenated SBR |  |  |  |
|  | (A8) CEBC copolymer |  |  |  |
| (B) Phosphate compound | (B1) Piperazine pyrophosphate + Melamine pyrophosphate | 5 | 5 | 5 |
|  | (B2) Piperazine pyrophosphate + Melamine pyrophosphate + Zinc oxide |  |  |  |
| (C) Organic phosphorous compound | (C1) Phosphonic acid-pentaerythritol ester based flame retardant ($X^1$, $X^2$: Benzyl group (phenylmethyl group)) | 30 | 45 | 50 |
| (D) Fluorine based drip preventing agent | (D1) Modified PTFE | 2 | 2 | 2 |
| Flame retardancy | UL94 vertical burning test | V-0 (5 mm) | V-0 (5 mm) | V-2 (5 mm) |
|  | UL94 5 V test | 5VA | 5VB | — |
| Processability | MFR (g/10 min) | 5.3 | 4.9 | 4.8 |
|  | MFR as a basis for calculating increase rate of MFR (g/10 min) | 4.7 (Comparative Example 1) | 4.7 (Comparative Example 1) | 4.7 (Comparative Example 1) |
|  | Increase rate of MFR (%) | 11.3 | 4.1 | 2.1 |
|  | Specific gravity | 1.02 | 1.05 | 1.06 |

TABLE 2

|  |  | Comparative Example 2 | Example 9 | Example 10 | Example 11 | Example 12 | Example 13 |
|---|---|---|---|---|---|---|---|
| (A) Polyolefin resin | (A1) b-PP-1 | 90 | 90 | 90 | 90 | 90 | 90 |
|  | (A2) b-PP-2 |  |  |  |  |  |  |
|  | (A3) h-PP |  |  |  |  |  |  |
|  | (A4) HDPE |  |  |  |  |  |  |
|  | (A5) LLDPE |  |  |  |  |  |  |
|  | (A6) PP elastomer | 10 | 10 | 10 | 10 | 10 | 10 |
|  | (A7) Hydrogenated SBR |  |  |  |  |  |  |
|  | (A8) CEBC copolymer |  |  |  |  |  |  |
| (B) Phosphate compound | (B1) Piperazine pyrophosphate + Melamine pyrophosphate | 10 | 10 | 10 | 10 | 10 | 10 |
|  | (B2) Piperazine pyrophosphate + Melamine pyrophosphate + Zinc oxide |  |  |  |  |  |  |

TABLE 2-continued

|  |  |  |  |  |  |  |  |
|---|---|---|---|---|---|---|---|
| (C) Organic phosphorous compound | (C1) Phosphonic acid-pentaerythritol ester based flame retardant ($X^1$, $X^2$: Benzyl group (phenylmethyl group)) | 0 | 0.1 | 1 | 2.5 | 5 | 10 |
| (D) Fluorine based drip preventing agent | (D1) Modified PTFE | 2 | 2 | 2 | 2 | 2 | 2 |
| Flame retardancy | UL94 vertical burning test | Burned down (5 mm) | V-1 (5 mm) | V-0 (5 mm) | V-0 (5 mm) | V-0 (5 mm) | V-0 (5 mm) |
|  | UL94 5 V test | — | — | Burned down | 5VB | 5VA | 5VA |
| Processability | MFR (g/10 min) | 3.8 | 3.9 | 4.0 | 4.1 | 4.3 | 4.6 |
|  | MFR as a basis for calculating increase rate of MFR (g/10 min) | 3.8 (Comparative Example 2) | 3.8 (Comparative Example 2) | 3.8 (Comparative Example 2) | 3.8 (Comparative Example 2) | 3.8 (Comparative Example 2) | 3.8 (Comparative Example 2) |
|  | Increase rate of MFR (%) | 0 | 2.6 | 5.0 | 7.3 | 11.6 | 17.4 |
|  | Specific gravity | 0.97 | 0.97 | 0.97 | 0.98 | 0.98 | 0.99 |

|  |  |  | Example 14 | Example 15 | Example 16 |
|---|---|---|---|---|---|
| (A) Polyolefin resin | (A1) b-PP-1 |  | 90 | 90 | 90 |
|  | (A2) b-PP-2 |  |  |  |  |
|  | (A3) h-PP |  |  |  |  |
|  | (A4) HDPE |  |  |  |  |
|  | (A5) LLDPE |  |  |  |  |
|  | (A6) PP elastomer |  | 10 | 10 | 10 |
|  | (A7) Hydrogenated SBR |  |  |  |  |
|  | (A8) CEBC copolymer |  |  |  |  |
| (B) Phosphate compound | (B1) Piperazine pyrophosphate + Melamine pyrophosphate |  | 10 | 10 | 10 |
|  | (B2) Piperazine pyrophosphate + Melamine pyrophosphate + Zinc oxide |  |  |  |  |
| (C) Organic phosphorous compound | (C1) Phosphonic acid-pentaerythritol ester based flame retardant ($X^1$, $X^2$: Benzyl group (phenylmethyl group)) |  | 30 | 45 | 50 |
| (D) Fluorine based drip preventing agent | (D1) Modified PTFE |  | 2 | 2 | 2 |
| Flame retardancy | UL94 vertical burning test |  | V-0 (5 mm) | V-0 (5 mm) | V-2 (5 mm) |
|  | UL94 5 V test |  | 5VA | 5VB | — |
| Processability | MFR (g/10 min) |  | 4.8 | 4.0 | 3.9 |
|  | MFR as a basis for calculating increase rate of MFR (g/10 min) |  | 3.8 (Comparative Example 2) | 3.8 (Comparative Example 2) | 3.8 (Comparative Example 2) |
|  | Increase rate of MFR (%) |  | 20.8 | 5.0 | 2.6 |
|  | Specific gravity |  | 1.03 | 1.06 | 1.07 |

TABLE 3

|  |  | Comparative Example 3 | Example 17 | Example 18 | Example 19 | Example 20 | Example 21 |
|---|---|---|---|---|---|---|---|
| (A) Polyolefin resin | (A1) b-PP-1 | 90 | 90 | 90 | 90 | 90 | 90 |
|  | (A2) b-PP-2 |  |  |  |  |  |  |
|  | (A3) h-PP |  |  |  |  |  |  |
|  | (A4) HDPE |  |  |  |  |  |  |
|  | (A5) LLDPE |  |  |  |  |  |  |
|  | (A6) PP elastomer | 10 | 10 | 10 | 10 | 10 | 10 |
|  | (A7) Hydrogenated SBR |  |  |  |  |  |  |
|  | (A8) CEBC copolymer |  |  |  |  |  |  |
| (B) Phosphate compound | (B1) Piperazine pyrophosphate + Melamine pyrophosphate | 15 | 15 | 15 | 15 | 15 | 15 |
|  | (B2) Piperazine pyrophosphate + Melamine pyrophosphate + Zinc oxide |  |  |  |  |  |  |
| (C) Organic phosphorous compound | (C1) Phosphonic acid-pentaerythritol ester based flame retardant ($X^1$, $X^2$: Benzyl group (phenylmethyl group)) | 0 | 0.1 | 1 | 2.5 | 5 | 10 |

TABLE 3-continued

| | | | | | | | |
|---|---|---|---|---|---|---|---|
| (D) Fluorine based drip preventing agent | (D1) Modified PTFE | 2 | 2 | 2 | 2 | 2 | 2 |
| Flame retardancy | UL94 vertical burning test | Burned down (4 mm) | V-1 (4 mm) | V-0 (4 mm) | V-0 (4 mm) | V-0 (4 mm) | V-0 (4 mm) |
| | UL94 5 V test | — | — | Burned down | 5VB | 5VA | 5VA |
| Processability | MFR (g/10 min) | 3.2 | 3.3 | 3.4 | 3.5 | 3.6 | 3.9 |
| | MFR as a basis for calculating increase rate of MFR (g/10 min) | 3.2 (Comparative Example 3) | 3.2 (Comparative Example 3) | 3.2 (Comparative Example 3) | 3.2 (Comparative Example 3) | 3.2 (Comparative Example 3) | 3.2 (Comparative Example 3) |
| | Increase rate of MFR (%) | 0 | 3.0 | 5.9 | 8.6 | 11.1 | 17.9 |
| | Specific gravity | 0.98 | 0.98 | 0.98 | 0.99 | 0.99 | 1.00 |

| | | | Example 22 | Example 23 | Example 24 |
|---|---|---|---|---|---|
| (A) Polyolefin resin | (A1) b-PP-1 | | 90 | 90 | 90 |
| | (A2) b-PP-2 | | | | |
| | (A3) h-PP | | | | |
| | (A4) HDPE | | | | |
| | (A5) LLDPE | | | | |
| | (A6) PP elastomer | | 10 | 10 | 10 |
| | (A7) Hydrogenated SBR | | | | |
| | (A8) CEBC copolymer | | | | |
| (B) Phosphate compound | (B1) Piperazine pyrophosphate + Melamine pyrophosphate | | 15 | 15 | 15 |
| | (B2) Piperazine pyrophosphate + Melamine pyrophosphate + Zinc oxide | | | | |
| (C) Organic phosphorous compound | (C1) Phosphonic acid- pentaerythritol ester based flame retardant ($X^1$, $X^2$: Benzyl group (phenylmethyl group)) | | 30 | 45 | 50 |
| (D) Fluorine based drip preventing agent | (D1) Modified PTFE | | 2 | 3 | 4 |
| Flame retardancy | UL94 vertical burning test | | V-0 (4 mm) | V-0 (4 mm) | V-2 (4 mm) |
| | UL94 5 V test | | 5VA | 5VB | — |
| Processability | MFR (g/10 min) | | 4.2 | 3.4 | 3.3 |
| | MFR as a basis for calculating increase rate of MFR (g/10 min) | | 3.2 (Comparative Example 3) | 3.2 (Comparative Example 3) | 3.2 (Comparative Example 3) |
| | Increase rate of MFR (%) | | 23.8 | 5.9 | 3.0 |
| | Specific gravity | | 1.04 | 1.07 | 1.08 |

TABLE 4

| | | Comparative Example 4 | Example 25 | Example 26 | Example 27 | Example 28 | Example 29 |
|---|---|---|---|---|---|---|---|
| (A) Polyolefin resin | (A1) b-PP-1 | 90 | 90 | 90 | 90 | 90 | 90 |
| | (A2) b-PP-2 | | | | | | |
| | (A3) h-PP | | | | | | |
| | (A4) HDPE | | | | | | |
| | (A5) LLDPE | | | | | | |
| | (A6) PP elastomer | 10 | 10 | 10 | 10 | 10 | 10 |
| | (A7) Hydrogenated SBR | | | | | | |
| | (A8) CEBC copolymer | | | | | | |
| (B) Phosphate compound | (B1) Piperazine pyrophosphate + Melamine pyrophosphate | 20 | 20 | 20 | 20 | 20 | 20 |
| | (B2) Piperazine pyrophosphate + Melamine pyrophosphate + Zinc oxide | | | | | | |
| (C) Organic phosphorous compound | (C1) Phosphonic acid- pentaerythritol ester based flame retardant ($X^1$, $X^2$: Benzyl group (phenylmethyl group)) | 0 | 0.1 | 1 | 2.5 | 5 | 10 |

TABLE 4-continued

|  |  |  |  |  |  |  |  |
|---|---|---|---|---|---|---|---|
| (D) Fluorine based drip preventing agent | (D1) Modified PTFE | 2 | 2 | 2 | 2 | 2 | 2 |
| Flame retardancy | UL94 vertical burning test | Burned down (3 mm) | V-1 (3 mm) | V-0 (3 mm) | V-0 (3 mm) | V-0 (3 mm) | V-0 (3 mm) |
|  | UL94 5 V test | — | — | Burned down | 5VB | 5VA | 5VA |
| Processability | MFR (g/10 min) | 2.8 | 2.9 | 3 | 3.1 | 3.2 | 3.5 |
|  | MFR as a basis for calculating increase rate of MFR (g/10 min) | 2.8 (Comparative Example 4) | 2.8 (Comparative Example 4) | 2.8 (Comparative Example 4) | 2.8 (Comparative Example 4) | 2.8 (Comparative Example 4) | 2.8 (Comparative Example 4) |
|  | Increase rate of MFR (%) | 0 | 3.4 | 6.7 | 9.7 | 12.5 | 20.0 |
|  | Specific gravity | 0.99 | 0.99 | 0.99 | 1.00 | 1.00 | 1.01 |

|  |  |  | Example 30 | Example 31 | Example 32 |
|---|---|---|---|---|---|
| (A) Polyolefin resin | (A1) b-PP-1 | | 90 | 90 | 90 |
|  | (A2) b-PP-2 | | | | |
|  | (A3) h-PP | | | | |
|  | (A4) HDPE | | | | |
|  | (A5) LLDPE | | | | |
|  | (A6) PP elastomer | | 10 | 10 | 10 |
|  | (A7) Hydrogenated SBR | | | | |
|  | (A8) CEBC copolymer | | | | |
| (B) Phosphate compound | (B1) Piperazine pyrophosphate + Melamine pyrophosphate | | 20 | 20 | 20 |
|  | (B2) Piperazine pyrophosphate + Melamine pyrophosphate + Zinc oxide | | | | |
| (C) Organic phosphorous compound | (C1) Phosphonic acid-pentaerythritol ester based flame retardant ($X^1$, $X^2$: Benzyl group (phenylmethyl group)) | | 30 | 45 | 50 |
| (D) Fluorine based drip preventing agent | (D1) Modified PTFE | | 2 | 2 | 2 |
| Flame retardancy | UL94 vertical burning test | | V-0 (3 mm) | V-0 (3 mm) | V-2 (3 mm) |
|  | UL94 5 V test | | 5VA | 5VB | — |
| Processability | MFR (g/10 min) | | 3.7 | 2.9 | 2.9 |
|  | MFR as a basis for calculating increase rate of MFR (g/10 min) | | 2.8 (Comparative Example 4) | 2.8 (Comparative Example 4) | 2.8 (Comparative Example 4) |
|  | Increase rate of MFR (%) | | 24.3 | 3.4 | 3.4 |
|  | Specific gravity | | 1.05 | 1.08 | 1.09 |

TABLE 5

|  |  | Comparative Example 5 | Example 33 | Example 34 | Example 35 | Example 36 | Example 37 |
|---|---|---|---|---|---|---|---|
| (A) Polyolefin resin | (A1) b-PP-1 | 90 | 90 | 90 | 90 | 90 | 90 |
|  | (A2) b-PP-2 | | | | | | |
|  | (A3) h-PP | | | | | | |
|  | (A4) HDPE | | | | | | |
|  | (A5) LLDPE | | | | | | |
|  | (A6) PP elastomer | 10 | 10 | 10 | 10 | 10 | 10 |
|  | (A7) Hydrogenated SBR | | | | | | |
|  | (A8) CEBC copolymer | | | | | | |
| (B) Phosphate compound | (B1) Piperazine pyrophosphate + Melamine pyrophosphate | 30 | 30 | 30 | 30 | 30 | 30 |
|  | (B2) Piperazine pyrophosphate + Melamine pyrophosphate + Zinc oxide | | | | | | |
| (C) Organic phosphorous compound | (C1) Phosphonic acid-pentaerythritol ester based flame retardant ($X^1$, $X^2$: Benzyl group (phenylmethyl group)) | 0 | 0.1 | 1 | 2.5 | 5 | 10 |

TABLE 5-continued

| | | | | | | | |
|---|---|---|---|---|---|---|---|
| (D) Fluorine based drip preventing agent | (D1) Modified PTFE | 2 | 2 | 2 | 2 | 2 | 2 |
| Flame retardancy | UL94 vertical burning test | Burned down (1.6 mm) | V-1 (1.6 mm) | V-0 (1.6 mm) | V-0 (1.6 mm) | V-0 (1.6 mm) | V-0 (1.6 mm) |
| | UL94 5 V test | — | — | Burned down | 5VB | 5VA | 5VA |
| Processability | MFR (g/10 min) | 2.2 | 2.3 | 2.4 | 2.5 | 2.7 | 3.0 |
| | MFR as a basis for calculating increase rate of MFR (g/10 min) | 2.2 (Comparative Example 5) | 2.2 (Comparative Example 5) | 2.2 (Comparative Example 5) | 2.2 (Comparative Example 5) | 2.2 (Comparative Example 5) | 2.2 (Comparative Example 5) |
| | Increase rate of MFR (%) | 0 | 4.3 | 8.3 | 12.0 | 18.5 | 26.7 |
| | Specific gravity | 1.02 | 1.02 | 1.023 | 1.03 | 1.03 | 1.04 |

| | | | Example 38 | Example 39 | Example 40 |
|---|---|---|---|---|---|
| (A) Polyolefin resin | (A1) b-PP-1 | | 90 | 90 | 90 |
| | (A2) b-PP-2 | | | | |
| | (A3) h-PP | | | | |
| | (A4) HDPE | | | | |
| | (A5) LLDPE | | | | |
| | (A6) PP elastomer | | 10 | 10 | 10 |
| | (A7) Hydrogenated SBR | | | | |
| | (A8) CEBC copolymer | | | | |
| (B) Phosphate compound | (B1) Piperazine pyrophosphate + Melamine pyrophosphate | | 30 | 30 | 30 |
| | (B2) Piperazine pyrophosphate + Melamine pyrophosphate Zinc oxide | | | | |
| (C) Organic phosphorous compound | (C1) Phosphonic acid-pentaerythritol ester based flame retardant ($X^1$, $X^2$: Benzyl group (phenylmethyl group)) | | 30 | 45 | 50 |
| (D) Fluorine based drip preventing agent | (D1) Modified PTFE | | 2 | 2 | 2 |
| Flame retardancy | UL94 vertical burning test | | V-0 (1.6 mm) | V-0 (1.6 mm) | V-2 (1.6 mm) |
| | UL94 5 V test | | 5VA | 5VB | — |
| Processability | MFR (g/10 min) | | 3.2 | 2.3 | 2.3 |
| | MFR as a basis for calculating increase rate of MFR (g/10 min) | | 2.2 (Comparative Example 5) | 2.2 (Comparative Example 5) | 2.2 (Comparative Example 5) |
| | Increase rate of MFR (%) | | 31.3 | 4.3 | 4.3 |
| | Specific gravity | | 1.08 | 1.11 | 1.12 |

TABLE 6

| | | Comparative Example 6 | Example 41 | Example 42 | Example 43 | Example 44 | Example 45 |
|---|---|---|---|---|---|---|---|
| (A) Polyolefin resin | (A1) b-PP-1 | 90 | 90 | 90 | 90 | 90 | 90 |
| | (A2) b-PP-2 | | | | | | |
| | (A3) h-PP | | | | | | |
| | (A4) HDPE | | | | | | |
| | (A5) LLDPE | | | | | | |
| | (A6) PP elastomer | 10 | 10 | 10 | 10 | 10 | 10 |
| | (A7) Hydrogenated SBR | | | | | | |
| | (A8) CEBC copolymer | | | | | | |
| (B) Phosphate compound | (B1) Piperazine pyrophosphate + Melamine pyrophosphate | 50 | 50 | 50 | 50 | 50 | 50 |
| | (B2) Piperazine pyrophosphate + Melamine pyrophosphate + Zinc oxide | | | | | | |
| (C) Organic phosphorous compound | (C1) Phosphonic acid-pentaerythritol ester based flame retardant ($X^1$, $X^2$: Benzyl group (phenylmethyl group)) | 0 | 0.1 | 1 | 2.5 | 5 | 10 |

TABLE 6-continued

|  |  |  |  |  |  |  |  |
|---|---|---|---|---|---|---|---|
| (D) Fluorine based drip preventing agent | (D1) Modified PTFE | 2 | 2 | 2 | 2 | 2 | 2 |
| Flame retardancy | UL94 vertical burning test | Burned down (0.8 mm) | V-1 (0.8 mm) | V-0 (0.8 mm) | V-0 (0.8 mm) | V-0 (0.8 mm) | V-0 (0.8 mm) |
|  | UL94 5 V test | — | — | Burned down | 5VB | 5VA | 5VA |
| Processability | MFR (g/10 min) | 1.3 | 1.4 | 1.5 | 1.6 | 1.8 | 2.1 |
|  | MFR as a basis for calculating increase rate of MFR (g/10 min) | 1.3 (Comparative Example 6) | 1.3 (Comparative Example 6) | 1.3 (Comparative Example 6) | 1.3 (Comparative Example 6) | 1.3 (Comparative Example 6) | 1.3 (Comparative Example 6) |
|  | Increase rate of MFR (%) | 0 | 7.1 | 13.3 | 18.8 | 27.8 | 38.1 |
|  | Specific gravity | 1.07 | 1.07 | 1.07 | 1.08 | 1.08 | 1.09 |

|  |  |  | Example 46 | Example 47 | Example 48 |
|---|---|---|---|---|---|
| (A) Polyolefin resin | (A1) b-PP-1 |  | 90 | 90 | 90 |
|  | (A2) b-PP-2 |  |  |  |  |
|  | (A3) h-PP |  |  |  |  |
|  | (A4) HDPE |  |  |  |  |
|  | (A5) LLDPE |  |  |  |  |
|  | (A6) PP elastomer |  | 10 | 10 | 10 |
|  | (A7) Hydrogenated SBR |  |  |  |  |
|  | (A8) CEBC copolymer |  |  |  |  |
| (B) Phosphate compound | (B1) Piperazine pyrophosphate + Melamine pyrophosphate |  | 50 | 50 | 50 |
|  | (B2) Piperazine pyrophosphate + Melamine pyrophosphate + Zinc oxide |  |  |  |  |
| (C) Organic phosphorous compound | (C1) Phosphonic acid-pentaerythritol ester based flame retardant ($X^1$, $X^2$: Benzyl group (phenylmethyl group)) |  | 30 | 45 | 50 |
| (D) Fluorine based drip preventing agent | (D1) Modified PTFE |  | 2 | 2 | 2 |
| Flame retardancy | UL94 vertical burning test |  | V-0 (0.8 mm) | V-0 (0.8 mm) | V-2 (0.8 mm) |
|  | UL94 5V test |  | 5VA | 5VB | — |
| Processability | MFR (g/10 min) |  | 2.3 | 1.4 | 1.4 |
|  | MFR as a basis for calculating increase rate of MFR (g/10 min) |  | 1.3 (Comparative Example 6) | 1.3 (Comparative Example 6) | 1.3 (Comparative Example 6) |
|  | Increase rate of MFR (%) |  | 43.5 | 7.1 | 7.1 |
|  | Specific gravity |  | 1.13 | 1.16 | 1.17 |

TABLE 7

|  |  | Comparative Example 7 | Example 49 | Example 50 | Example 51 | Example 52 | Example 53 | Example 54 | Example 55 | Example 56 |
|---|---|---|---|---|---|---|---|---|---|---|
| (A) Polyolefin resin | (A1) b-PP-1 | 90 | 90 | 90 | 90 | 90 | 90 | 90 | 90 | 90 |
|  | (A2) b-PP-2 |  |  |  |  |  |  |  |  |  |
|  | (A3) h-PP |  |  |  |  |  |  |  |  |  |
|  | (A4) HDPE |  |  |  |  |  |  |  |  |  |
|  | (A5) LLDPE |  |  |  |  |  |  |  |  |  |
|  | (A6) PP elastomer | 10 | 10 | 10 | 10 | 10 | 10 | 10 | 10 | 10 |
|  | (A7) Hydrogenated SBR |  |  |  |  |  |  |  |  |  |
|  | (A8) CEBC copolymer |  |  |  |  |  |  |  |  |  |
| (B) Phosphate compound | (B1) Piperazine pyrophosphate + Melamine pyrophosphate | 70 | 70 | 70 | 70 | 70 | 70 | 70 | 70 | 70 |
|  | (B2) Piperazine pyrophosphate + Melamine pyrophosphate + Zinc oxide |  |  |  |  |  |  |  |  |  |

TABLE 7-continued

| | | Comparative Example 7 | Example 49 | Example 50 | Example 51 | Example 52 | Example 53 | Example 54 | Example 55 | Example 56 |
|---|---|---|---|---|---|---|---|---|---|---|
| (C) Organic phosphorous compound | (C1) Phosphonic acid-pentaerythritol ester based flame retardant ($X^1$, $X^2$: Benzyl group (phenylmethyl group)) | 0 | 0.1 | 1 | 2.5 | 5 | 10 | 30 | 45 | 50 |
| (D) Fluorine based drip preventing agent | (D1) Modified PTFE | 2 | 2 | 2 | 2 | 2 | 2 | 2 | 2 | 2 |
| Flame retardancy | UL94 vertical burning test | Burned down (0.4 mm) | V-1 (0.4 mm) | V-0 (0.4 mm) | V-0 (0.4 mm) | V-0 (0.4 mm) | V-0 (0.4 mm) | V-0 (0.4 mm) | V-0 (0.4 mm) | V-2 (0.4 mm) |
| | UL94 5V test | — | — | Burned down | 5VB | 5VA | 5VA | 5VA | 5VB | — |
| Processability | MFR (g/10 min) | 0.5 | 0.6 | 0.7 | 0.8 | 1.0 | 1.3 | 1.5 | 0.6 | 0.6 |
| | MFR as a basis for calculating increase rate of MFR (g/10 min) | 0.5 (Comparative Example 7) | 0.5 (Comparative Example 7) | 0.5 (Comparative Example 7) | 0.5 (Comparative Example 7) | 0.5 (Comparative Example 7) | 0.5 (Comparative Example 7) | 0.5 (Comparative Example 7) | 0.5 (Comparative Example 7) | 0.5 (Comparative Example 7) |
| | Increase rate of MFR (%) | 0 | 16.7 | 28.6 | 37.5 | 50.0 | 61.5 | 66.7 | 16.7 | 16.7 |
| | Specific gravity | 1.11 | 1.11 | 1.11 | 1.12 | 1.12 | 1.13 | 1.17 | 1.20 | 1.21 |

TABLE 8

| | | Comparative Example 8 | Example 57 | Example 58 | Example 59 | Example 60 | Example 61 | Example 62 | Example 63 | Example 64 |
|---|---|---|---|---|---|---|---|---|---|---|
| (A) Polyolefin resin | (A1) b-PP-1 | 90 | 90 | 90 | 90 | 90 | 90 | 90 | 90 | 90 |
| | (A2) b-PP-2 | | | | | | | | | |
| | (A3) h-PP | | | | | | | | | |
| | (A4) HDPE | | | | | | | | | |
| | (A5) LLDPE | | | | | | | | | |
| | (A6) PP elastomer | 10 | 10 | 10 | 10 | 10 | 10 | 10 | 10 | 10 |
| | (A7) Hydrogenated SBR | | | | | | | | | |
| | (A8) CEBC copolymer | | | | | | | | | |
| (B) Phosphate compound | (B1) Piperazine pyrophosphate + Melamine pyrophosphate | 90 | 90 | 90 | 90 | 90 | 90 | 90 | 90 | 90 |
| | (B2) Piperazine pyrophosphate + Melamine pyrophosphate + Zinc oxide | | | | | | | | | |
| (C) Organic phosphorous compound | (C1) Phosphonic acid-pentaerythritol ester based flame retardant ($X^1$, $X^2$: Benzyl group (phenylmethyl group)) | 0 | 0.1 | 1 | 2.5 | 5 | 10 | 30 | 45 | 50 |

TABLE 8-continued

|  |  | Comparative Example 8 | Example 57 | Example 58 | Example 59 | Example 60 | Example 61 | Example 62 | Example 63 | Example 64 |
|---|---|---|---|---|---|---|---|---|---|---|
| (D) Fluorine based drip preventing agent | (D1) Modified PTFE | 2 | 2 | 2 | 2 | 2 | 2 | 2 | 2 | 2 |
| Flame retardancy | UL94 vertical burning test | Burned down (0.2 mm) | V-1 (0.2 mm) | V-0 (0.2 mm) | V-0 (0.2 mm) | V-0 (0.2 mm) | V-0 (0.2 mm) | V-0 (0.2 mm) | V-0 (0.2 mm) | V-2 (0.2 mm) |
|  | UL94 5V test | — | — | Burned down | 5VB | 5VA | 5VA | 5VA | 5VB | — |
| Processability | MFR (g/10 min) | 0.2 | 0.3 | 0.4 | 0.5 | 0.7 | 1.0 | 1.1 | 0.3 | 0.3 |
|  | MFR as a basis for calculating increase rate of MFR (g/10 min) | 0.2 (Comparative Example 8) | 0.2 (Comparative Example 8) | 0.2 (Comparative Example 8) | 0.2 (Comparative Example 8) | 0.2 (Comparative Example 8) | 0.2 (Comparative Example 8) | 0.2 (Comparative Example 8) | 0.2 (Comparative Example 8) | 0.2 (Comparative Example 8) |
|  | Increase rate of MFR (%) | 0 | 33.3 | 53.0 | 60.0 | 71.4 | 80.0 | 81.8 | 33.3 | 33.3 |
|  | Specific gravity | 1.15 | 1.15 | 1.15 | 1.16 | 1.16 | 1.17 | 1.21 | 1.24 | 1.26 |

TABLE 9

|  |  | Comparative Example 9 | Example 65 | Example 66 | Example 67 | Example 68 | Example 69 | Example 70 | Example 71 | Example 72 |
|---|---|---|---|---|---|---|---|---|---|---|
| (A) Polyolefin resin | (A1) b-PP-1 | 90 | 90 | 90 | 90 | 90 | 90 | 90 | 90 | 90 |
|  | (A2) b-PP-2 |  |  |  |  |  |  |  |  |  |
|  | (A3) h-PP |  |  |  |  |  |  |  |  |  |
|  | (A4) HDPE |  |  |  |  |  |  |  |  |  |
|  | (A5) LLDPE |  |  |  |  |  |  |  |  |  |
|  | (A6) PP elastomer | 10 | 10 | 10 | 10 | 10 | 10 | 10 | 10 | 10 |
|  | (A7) Hydrogenated SBR |  |  |  |  |  |  |  |  |  |
|  | (A8) CEBC copolymer |  |  |  |  |  |  |  |  |  |
| (B) Phosphate compound | (B1) Piperazine pyrophosphate + Melamine pyrophosphate | 120 | 120 | 120 | 120 | 120 | 120 | 120 | 120 | 120 |
|  | (B2) Piperazine pyrophosphate + Melamine pyrophosphate + Zinc oxide |  |  |  |  |  |  |  |  |  |
| (C) Organic phosphorous compound | (C1) Phosphonic acid-pentaerythritol ester based flame retardant ($X^1$, $X^2$: Benzyl group (phenylmethyl group)) | 0 | 0.1 | 1 | 2.5 | 5 | 10 | 30 | 45 | 50 |
| (D) Fluorine based drip preventing agent | (D1) Modified PTFE | 2 | 2 | 2 | 2 | 2 | 2 | 2 | 2 | 2 |
| Flame retardancy | UL94 vertical burning test | Burned down (0.2 mm) | V-1 (0.2 mm) | V-0 (0.2 mm) | V-0 (0.2 mm) | V-0 (0.2 mm) | V-0 (0.2 mm) | V-0 (0.2 mm) | V-0 (0.2 mm) | V-2 (0.2 mm) |
|  | UL94 5V test | — | — | Burned down | 5VB | 5VA | 5VA | 5VA | 5VB | — |
| Processability | MFR (g/10 min) | 0.2 | 0.3 | 0.4 | 0.5 | 0.7 | 1.0 | 1.1 | 0.3 | 0.3 |
|  | MFR as a basis for calculating increase rate of MFR (g/10 min) | 0.2 (Comparative Example 9) | 0.2 (Comparative Example 9) | 0.2 (Comparative Example 9) | 0.2 (Comparative Example 9) | 0.2 (Comparative Example 9) | 0.2 (Comparative Example 9) | 0.2 (Comparative Example 9) | 0.2 (Comparative Example 9) | 0.2 (Comparative Example 9) |
|  | Increase rate of MFR (%) | 0 | 33.3 | 50.0 | 60.0 | 71.4 | 80.0 | 81.8 | 33.3 | 33.3 |
|  | Specific gravity | 1.21 | 1.21 | 1.21 | 1.22 | 1.22 | 1.23 | 1.29 | 1.31 | 1.32 |

TABLE 10

| | | Comparative Example 10 | Example 73 | Comparative Example 11 | Example 74 | Comparative Example 12 | Example 75 |
|---|---|---|---|---|---|---|---|
| (A) Polyolefin resin | (A1) b-PP-1 | 100 | 100 | 90 | 90 | 80 | 80 |
| | (A2) b-PP-2 | | | | | | |
| | (A3) h-PP | | | | | | |
| | (A4) HDPE | | | | | | |
| | (A5) LLDPE | | | | | | |
| | (A6) PP elastomer | | | 10 | 10 | 20 | 20 |
| | (A7) Hydrogenated SBR | | | | | | |
| | (A8) CEBC copolymer | | | | | | |
| (B) Phosphate compound | (B1) Piperazine pyrophosphate + Melamine pyrophosphate | 30 | 30 | 30 | 30 | 30 | 30 |
| | (B2) Piperazine pyrophosphate + Melamine pyrophosphate + Zinc oxide | | | | | | |
| (C) Organic phosphorous compound | (C1) Phosphonic acid-pentaerythritol ester based flame retardant ($X^1$, $X^2$: Benzyl group (phenylmethyl group)) | 0 | 10 | 0 | 10 | 0 | 10 |
| (D) Fluorine based drip preventing agent | (D1) Modified PTFE | 2 | 2 | 2 | 2 | 2 | 2 |
| Flame retardancy | UL94 vertical burning test | Burned down (1.6 mm) | V-0 (1.6 mm) | Burned down (1.6 mm) | V-0 (1.6 mm) | Burned down (1.6 mm) | V-0 (1.6 mm) |
| | UL94 5V test | — | 5VA | — | 5VA | — | 5VA |
| Processability | MFR (g/10 min) | 1.8 | 2.6 | 2.2 | 3 | 2.3 | 3.1 |
| | MFR as a basis for calculating increase rate of MFR (g/10 min) | 1.8 (Comparative Example 10) | 1.8 (Comparative Example 10) | 2.2 (Comparative Example 11) | 2.2 (Comparative Example 11) | 2.3 (Comparative Example 12) | 2.3 (Comparative Example 12) |
| | Increase rate of MFR (%) | 0 | 30.8 | 0 | 26.7 | 0 | 25.8 |
| | Specific gravity | 1.03 | 1.05 | 1.02 | 1.04 | 1.01 | 1.03 |

TABLE 11

| | | Comparative Example 13 | Example 76 | Comparative Example 14 | Example 77 | Comparative Example 15 | Example 78 | Comparative Example 16 | Example 79 |
|---|---|---|---|---|---|---|---|---|---|
| (A) Polyolefin resin | (A1) b-PP-1 | 60 | 60 | 40 | 40 | 20 | 20 | | |
| | (A2) b-PP-2 | | | | | | | | |
| | (A3) h-PP | | | | | | | | |
| | (A4) HDPE | | | | | | | | |
| | (A5) LLDPE | | | | | | | | |
| | (A6) PP elastomer | 40 | 40 | 60 | 60 | 80 | 80 | 100 | 100 |
| | (A7) Hydrogenated SBR | | | | | | | | |
| | (A8) CEBC copolymer | | | | | | | | |
| (B) Phosphate compound | (B1) Piperazine pyrophosphate + Melamine pyrophosphate | 30 | 30 | 30 | 30 | 30 | 30 | 30 | 30 |
| | (B2) Piperazine pyrophosphate + Melamine pyrophosphate + Zinc oxide | | | | | | | | |

TABLE 11-continued

|  |  | Comparative Example 13 | Example 76 | Comparative Example 14 | Example 77 | Comparative Example 15 | Example 78 | Comparative Example 16 | Example 79 |
|---|---|---|---|---|---|---|---|---|---|
| (C) Organic phosphorous compound | (C1) Phosphonic acid-pentaerythritol ester based flame retardant ($X^1$, $X^2$: Benzyl group (phenylmethyl group)) | 0 | 10 | 0 | 10 | 0 | 10 | 0 | 10 |
| (D) Fluorine based drip preventing agent | (D1) Modified PTFE | 2 | 2 | 2 | 2 | 2 | 2 | 2 | 2 |
| Flame retardancy | UL94 vertical burning test | Burned down (1.6 mm) | V-0 (1.6 mm) | Burned down (1.6 mm) | V-0 (1.6 mm) | Burned down (1.6 mm) | V-1 (1.6 mm) | Burned down (1.6 mm) | V-1 (1.6 mm) |
|  | UL94 5V test | — | 5VB | — | 5VB | — | — | — | — |
| Processability | MFR (g/10 min) | 2.5 | 3.3 | 2.8 | 3.6 | 3.1 | 3.9 | 3.4 | 4.2 |
|  | MFR as a basis for calculating increase rate of MFR (g/10 min) | 2.5 (Comparative Example 13) | 2.5 (Comparative Example 13) | 2.8 (Comparative Example 14) | 2.8 (Comparative Example 14) | 3.1 (Comparative Example 15) | 3.1 (Comparative Example 15) | 3.4 (Comparative Example 16) | 3.4 (Comparative Example 16) |
|  | Increase rate of MFR (%) | 0 | 24.2 | 0 | 22.2 | 0 | 20.5 | 0 | 19.0 |
| Specific gravity |  | 1.01 | 1.03 | 1.00 | 1.02 | 0.99 | 1.01 | 0.99 | 1.01 |

TABLE 12

|  |  | Comparative Example 17 | Example 80 | Comparative Example 18 | Example 81 | Comparative Example 19 | Example 82 |
|---|---|---|---|---|---|---|---|
| (A) Polyolefin resin | (A1) b-PP-1 |  |  |  |  |  |  |
|  | (A2) b-PP-2 | 100 | 100 |  |  |  |  |
|  | (A3) h-PP |  |  | 100 | 100 |  |  |
|  | (A4) HDPE |  |  |  |  | 100 | 100 |
|  | (A5) LLDPE |  |  |  |  |  |  |
|  | (A6) PP elastomer |  |  |  |  |  |  |
|  | (A7) Hydrogenated SBR |  |  |  |  |  |  |
|  | (A8) CEBC copolymer |  |  |  |  |  |  |
| (B) Phosphate compound | (B1) Piperazine pyrophosphate + Melamine pyrophosphate | 30 | 30 | 30 | 30 | 30 | 30 |
|  | (B2) Piperazine pyrophosphate + Melamine pyrophosphate + Zinc oxide |  |  |  |  |  |  |
| (C) Organic phosphorous compound | (C1) Phosphonic acid-pentaerythritol ester based flame retardant ($X^1$, $X^2$: Benzyl group (phenylmethyl group)) | 0 | 10 | 0 | 10 | 0 | 10 |
| (D) Fluorin based drip preventing agent | (D1) Modified PTFE | 2 | 2 | 2 | 2 | 2 | 2 |
| Flame retardancy | UL94 vertical burning test | Burned down (1.6 mm) | V-0 (1.6 mm) | Burned down (1.6 mm) | V-0 (1.6 mm) | Burned down (1.6 mm) | V-0 (1.6 mm) |
|  | UL94 5V test | — | 5VA | — | 5VA | — | 5VA |
| Processability | MFR (g/10 min) | 3.8 | 4.5 | 3.9 | 4.6 | 0.1 | 0.2 |
|  | MFR as a basis for calculating increase rate of MFR (g/10 min) | 3.8 (Comparative Example 17) | 3.8 (Comparative Example 17) | 3.9 (Comparative Example 18) | 3.9 (Comparative Example 18) | 0.1 (Comparative Example 19) | 0.1 (Comparative Example 19) |
|  | Increase rate of MFR (%) | 0 | 15.6 | 0 | 15.2 | 0 | 50.0 |
| Specific gravity |  | 1.03 | 1.05 | 1.03 | 1.05 | 1.05 | 1.07 |

TABLE 13

|  |  | Comparative Example 20 | Example 83 | Comparative Example 21 | Example 84 | Comparative Example 22 | Example 85 |
|---|---|---|---|---|---|---|---|
| (A) Polyolefin resin | (A1) b-PP-1 |  |  | 90 | 90 | 90 | 90 |
|  | (A2) b-PP-2 |  |  |  |  |  |  |
|  | (A3) h-PP |  |  |  |  |  |  |
|  | (A4) HDPE |  |  |  |  |  |  |
|  | (A5) LLDPE | 100 | 100 |  |  |  |  |
|  | (A6) PP elastomer |  |  |  |  |  |  |
|  | (A7) Hydrogenated SBR |  |  | 10 | 10 |  |  |
|  | (A8) CEBC copolymer |  |  |  |  | 10 | 10 |
| (B) Phosphate compound | (B1) Piperazine pyrophosphate + Melamine pyrophosphate | 30 | 30 | 30 | 30 | 30 | 30 |
|  | (B2) Piperazine pyrophosphate + Melamine pyrophosphate + Zinc oxide |  |  |  |  |  |  |
| (C) Organic phosphorous compound | (C1) Phosphonic acid-pentaerythritol ester based flame retardant ($X^1$, $X^2$: Benzyl group (phenylmethyl group)) | 0 | 10 | 0 | 10 | 0 | 10 |
| (D) Fluorine based drip preventing agent | (D1) Modified PTFE | 2 | 2 | 2 | 2 | 2 | 2 |
| Flame retardancy | UL94 vertical burning test | Burned down (1.61 mm) | V-0 (1.6 mm) | Burned down (1.6 mm) | V-0 (1.6 mm) | Burned down (1.6 mm) | V-0 (1.6 mm) |
|  | UL94 5V test | — | 5VA | — | 5VA | — | 5VA |
| Processability | MFR (g/10 min) | 1.3 | 1.9 | 2.2 | 2.9 | 0.7 | 1.3 |
|  | MFR as a basis for calculating increase rate of MFR (g/10 min) | 1.3 (Comparative Example 20) | 1.3 (Comparative Example 20) | 2.2 (Comparative Example 21) | 2.2 (Comparative Example 21) | 0.7 (Comparative Example 22) | 0.7 (Comparative Example 22) |
|  | Increase rate of MFR (%) | 0 | 31.6 | 0 | 24.1 | 0 | 46.2 |
| Specific gravity |  | 1.04 | 1.06 | 1.02 | 1.04 | 1.03 | 1.05 |

TABLE 14

|  |  | Comparative Example 23 | Example 86 |
|---|---|---|---|
| (A) Polyolefin resin | (A1) b-PP-1 | 90 | 90 |
|  | (A2) b-PP-2 |  |  |
|  | (A3) h-PP |  |  |
|  | (A4) HDPE |  |  |
|  | (A5) LLDPE |  |  |
|  | (A6) PP elastomer | 10 | 10 |
|  | (A7) Hydrogenated SBR |  |  |
|  | (A8) CEBC copolymer |  |  |
| (B) Phosphate compound | (B1) Piperazine pyrophosphate + Melamine pyrophosphate |  |  |
|  | (B2) Piperazine pyrophosphate + Melamine pyrophosphate + Zinc oxide | 30 | 30 |
| (C) Organic phosphorous compound | (C1) Phosphonic acid-pentaerythritol ester based flame retardant ($X^1$, $X^2$: Benzyl group (phenylmethyl group)) | 0 | 10 |
| (D) Fluorine based drip preventing agent | (D1) Modified PTFE | 2 | 2 |
| Flame retardancy | UL94 vertical burning test | Burned down (1.6 mm) | V-0 (1.6 mm) |
|  | UL94 5 V test | — | 5 VA |

TABLE 14-continued

|  |  | Comparative Example 23 | Example 86 |
|---|---|---|---|
| Processability | MFR (g/10 min) | 2.2 | 3.1 |
|  | MFR as a basis for calculating increase rate of MFR (g/10 min) | 2.2 (Comparative Example 23) | 2.2 (Comparative Example 23) |
|  | Increase rate of MFR (%) | 0 | 29.0 |
|  | Specific gravity | 1.02 | 1.04 |

TABLE 15

|  |  | Comparative Example 24 | Comparative Example 25 | Comparative Example 26 | Comparative Example 27 | Comparative Example 28 |
|---|---|---|---|---|---|---|
| (A) Polyolefin resin | (A1) b-PP-1 | 90 | 90 | 90 | 90 | 90 |
|  | (A2) b-PP-2 |  |  |  |  |  |
|  | (A3) h-PP |  |  |  |  |  |
|  | (A4) HDPE |  |  |  |  |  |
|  | (A5) LLDPE |  |  |  |  |  |
|  | (A6) PP elastomer | 10 | 10 | 10 | 10 | 10 |
|  | (A7) Hydrogenated SBR |  |  |  |  |  |
|  | (A8) CEBC copolymer |  |  |  |  |  |
| (B) Phosphate compound | (B1) Piperazine pyrophosphate + Melamine pyrophosphate | 0 | 0 | 0 | 0 | 0 |
|  | (B2) Piperazine pyrophosphate + Melamine pyrophosphate + Zinc oxide |  |  |  |  |  |
| (C) Organic phosphorous compound | (C1) Phosphonic acid-pentaerythritol ester based flame retardant ($X^1$, $X^2$: Benzyl group (phenylmethyl group)) | 0 | 10 | 20 | 40 | 100 |
| (D) Fluorine based drip preventing agent | (D1) Modified PTFE | 2 | 2 | 2 | 2 | 2 |
| Flame retardancy | UL94 vertical burning test | Burned down (1.6 mm) | Burned down (1.6 mm) | Burned down (1.6 mm) | Burned down (1.6 mm) | Burned down (1.6 mm) |
|  | UL94 5V test | — | — | — | — | — |
| Processability | MFR (g/10 min) | 5.2 | 5.4 | 5.6 | 5.4 | 5.3 |
|  | MFR as a basis for calculating increase rate of MFR (g/10 min) | 5.2 (Comparative Example 24) | 5.2 (Comparative Example 24) | 5.2 (Comparative Example 24) | 5.2 (Comparative Example 24) | 5.2 (Comparative Example 24) |
|  | Increase rate of MFR (%) | 0 | 24.1 | 26.8 | 24.1 | 23 |
|  | Specific gravity | 0.88 | 0.90 | 0.92 | 0.96 | 1.18 |

TABLE 16

|  |  | Comparative Example 29 | Example 87 | Comparative Example 30 | Example 88 | Comparative Example 31 | Example 89 |
|---|---|---|---|---|---|---|---|
| (A) Polyolefin resin | (A1) b-PP-1 | 90 | 90 | 90 | 90 | 90 | 90 |
|  | (A2) b-PP-2 |  |  |  |  |  |  |
|  | (A3) h-PP |  |  |  |  |  |  |
|  | (A4) HDPE |  |  |  |  |  |  |
|  | (A5) LLDPE |  |  |  |  |  |  |
|  | (A6) PP elastomer | 10 | 10 | 10 | 10 | 10 | 10 |
|  | (A7) Hydrogenated SBR |  |  |  |  |  |  |
|  | (A8) CEBC copolymer |  |  |  |  |  |  |
| (B) Phosphate compound | (B1) Piperazine pyrophosphate + Melamine pyrophosphate | 30 | 30 | 30 | 30 | 30 | 30 |
|  | (B2) Piperazine pyrophosphate + Melamine pyrophosphate + Zinc oxide |  |  |  |  |  |  |

TABLE 16-continued

|  |  | Comparative Example 29 | Example 87 | Comparative Example 30 | Example 88 | Comparative Example 31 | Example 89 |
|---|---|---|---|---|---|---|---|
| (C) Organic phosphorous compound | (C1) Phosphonic acid-pentaerythritol ester based flame retardant (X¹, X²: Benzyl group (phenylmethyl group)) | 0 | 10 | 0 | 10 | 0 | 10 |
| (D) Fluorine based drip preventing agent | (D1) Modified PTFE | 0 | 0 | 0.1 | 0.1 | 0.2 | 0.2 |
| Flame retardancy | UL94 vertical burning test | Burned down (1.6 mm) | V-2 (1.6 mm) | Burned down (1.6 mm) | V-2 (1.6 mm) | Burned down (1.6 mm) | V-0 (1.6 mm) |
|  | UL94 5V test | — | — | — | — | — | 5VB |
| Processability | MFR (g/10 min) | 4.6 | 5.6 | 4.6 | 6 | 3.7 | 5.9 |
|  | MFR as a basis for calculating increase rate of MFR (g/10 min) | 4.6 (Comparative Example 29) | 4.6 (Comparative Example 29) | 4.6 (Comparative Example 30) | 4.6 (Comparative Example 30) | 3.7 (Comparative Example 31) | 3.7 (Comparative Example 31) |
|  | Increase rate of MFR (%) | 0 | 17.9 | 0 | 23.3 | 0 | 37.3 |
|  | Specific gravity | 1.00 | 1.02 | 1.00 | 1.02 | 1.00 | 1.02 |

TABLE 17

|  |  | Comparative Example 32 | Example 90 | Comparative Example 33 | Example 91 | Comparative Example 34 | Example 92 |
|---|---|---|---|---|---|---|---|
| (A) Polyolefin resin | (A1) b-PP-1 | 90 | 90 | 90 | 90 | 90 | 90 |
|  | (A2) b-PP-2 |  |  |  |  |  |  |
|  | (A3) h-PP |  |  |  |  |  |  |
|  | (A4) HDPE |  |  |  |  |  |  |
|  | (A5) LLDPE |  |  |  |  |  |  |
|  | (A6) PP elastomer | 10 | 10 | 10 | 10 | 10 | 10 |
|  | (A7) Hydrogenated SBR |  |  |  |  |  |  |
|  | (A8) CEBC copolymer |  |  |  |  |  |  |
| (B) Phosphate compound | (B1) Piperazine pyrophosphate + Melamine pyrophosphate | 30 | 30 | 30 | 30 | 30 | 30 |
|  | (B2) Piperazine pyrophosphate + Melamine pyrophosphate + Zinc oxide |  |  |  |  |  |  |
| (C) Organic phosphorous compound | (C1) Phosphonic acid-pentaerythritol ester based flame retardant (X¹, X²: Benzyl group (phenylmethyl group)) | 0 | 10 | 0 | 10 | 0 | 10 |
| (D) Fluorine based drip preventing agent | (D1) Modified PTFE | 2 | 2 | 5 | 5 | 10 | 10 |
| Flame retardancy | UL94 vertical burning test | Burned down (1.6 mm) | V-0 (1.6 mm) | Burned down (1.6 mm) | V-0 (1.6 mm) | Burned down (1.6 mm) | V-0 (1.6 mm) |
|  | UL94 5V test | — | 5VA | — | 5VA | — | 5VA |
| Processability | MFR (g/10 min) | 2.2 | 3 | 0.9 | 1.1 | 0.4 | 0.5 |
|  | MFR as a basis for calculating increase rate of MFR (g/10 min) | 2.2 (Comparative Example 32) | 2.2 (Comparative Example 32) | 0.9 (Comparative Example 33) | 0.9 (Comparative Example 33) | 0.4 (Comparative Example 34) | 0.4 (Comparative Example 34) |
|  | Increase rate of MFR (%) | 0 | 26.7 | 0 | 18.2 | 0 | 20.0 |
|  | Specific gravity | 1.02 | 1.04 | 1.08 | 1.10 | 1.16 | 1.18 |

TABLE 18

|  |  | Comparative Example 35 | Example 93 | Comparative Example 36 | Example 94 | Comparative Example 37 | Example 95 |
|---|---|---|---|---|---|---|---|
| (A) Polyolefin resin | (A1) b-PP-1 | 90 | 90 | 90 | 90 | 90 | 90 |
|  | (A2) b-PP-2 |  |  |  |  |  |  |
|  | (A3) h-PP |  |  |  |  |  |  |
|  | (A4) HDPE |  |  |  |  |  |  |
|  | (A5) LLDPE |  |  |  |  |  |  |
|  | (A6) PP elastomer | 10 | 10 | 10 | 10 | 10 | 10 |
|  | (A7) Hydrogenated SBR |  |  |  |  |  |  |
|  | (A8) CEBC copolymer |  |  |  |  |  |  |
| (B) Phosphate compound | (B1) Piperazine pyrophosphate + Melamine pyrophosphate | 30 | 30 | 30 | 30 | 30 | 30 |
|  | (B2) Piperazine pyrophosphate + Melamine pyrophosphate + Zinc oxide |  |  |  |  |  |  |
| (C) Organic phosphorous compound | (C1) Phosphonic acid-pentaerythritol ester based flame retardant ($X^1$, $X^2$: Benzyl group (phenylmethyl group)) | 0 | 10 | 0 | 10 | 0 | 10 |
| (D) Fluorine based drip preventing agent | (D2) Non-modified PTFE | 0 | 0 | 0.1 | 0.1 | 0.2 | 0.2 |
| Flame retardancy | UL94 vertical burning test | Burned down (1.6 mm) | V-2 (1.6 mm) | Burned down (1.6 mm) | V-2 (1.6 mm) | Burned down (1.6 mm) | V-2 (1.6 mm) |
|  | UL94 vertical burning test | — | — | — | — | — | — |
| Processability | MFR (g/10 min) | 4.4 | 5.3 | 4.4 | 5.2 | 3.4 | 5.0 |
|  | MFR as a basis for calculating increase rate of MFR (g/10 min) | 4.4 (Comparative Example 35) | 4.4 (Comparative Example 35) | 4.4 (Comparative Example 36) | 4.4 (Comparative Example 36) | 3.4 (Comparative Example 37) | 3.4 (Comparative Example 37) |
|  | Increase rate of MFR (%) | 0 | 17.0 | 0 | 15.4 | 0 | 32.0 |
|  | Specific gravity | 1.00 | 1.02 | 1.00 | 1.02 | 1.00 | 1.02 |

TABLE 19

|  |  | Comparative Example 38 | Example 96 | Comparative Example 39 | Example 97 | Comparative Example 40 | Example 98 |
|---|---|---|---|---|---|---|---|
| (A) Polyolefin resin | (A1) b-PP-1 | 90 | 90 | 90 | 90 | 90 | 90 |
|  | (A2) b-PP-2 |  |  |  |  |  |  |
|  | (A3) h-PP |  |  |  |  |  |  |
|  | (A4) HDPE |  |  |  |  |  |  |
|  | (A5) LLDPE |  |  |  |  |  |  |
|  | (A6) PP elastomer | 10 | 10 | 10 | 10 | 10 | 10 |
|  | (A7) Hydrogenated SBR |  |  |  |  |  |  |
|  | (A8) CEBC copolymer |  |  |  |  |  |  |
| (B) Phosphate compound | (B1) Piperazine pyrophosphate + Melamine pyrophosphate | 30 | 30 | 30 | 30 | 30 | 30 |
|  | (B2) Piperazine pyrophosphate + Melamine pyrophosphate + Zinc oxide |  |  |  |  |  |  |

TABLE 19-continued

|  |  | Comparative Example 38 | Example 96 | Comparative Example 39 | Example 97 | Comparative Example 40 | Example 98 |
|---|---|---|---|---|---|---|---|
| (C) Organic phosphorous compound | (C1) Phosphonic acid-pentaerythritol ester based flame retardant ($X^1$, $X^2$: Benzyl group (phenylmethyl group)) | 0 | 10 | 0 | 10 | 0 | 10 |
| (D) Fluorine based drip preventing agent | (D2) Non-modified PTFE | 2 | 2 | 5 | 5 | 10 | 10 |
| Flame retardancy | UL94 vertical burning test | Burned down (1.6 mm) | V-2 (1.6 mm) | Burned down (1.6 mm) | V-0 (1.6 mm) | Burned down (1.6 mm) | V-0 (1.6 mm) |
|  | UL94 5V test | — | — | — | 5VB | — | 5VB |
| Processability | MFR (g/10 min) | 2.0 | 2.9 | 0.8 | 0.9 | 0.3 | 0.4 |
|  | MFR as a basis for calculating increase rate of MFR (g/10 min) | 2.0 (Comparative Example 38) | 2.0 (Comparative Example 38) | 0.8 (Comparative Example 39) | 0.8 (Comparative Example 39) | 0.3 (Comparative Example 40) | 0.3 (Comparative Example 40) |
|  | Increase rate of MFR (%) | 0 | 31.0 | 0 | 11.1 | 0 | 25.0 |
|  | Specific gravity | 1.02 | 1.04 | 1.08 | 1.10 | 1.16 | 1.18 |

TABLE 20

|  |  | Comparative Example 41 | Example 99 | Comparative Example 42 | Example 100 | Comparative Example 43 | Example 101 |
|---|---|---|---|---|---|---|---|
| (A) Polyolefin resin | (A1) b-PP-1 | 90 | 90 | 90 | 90 | 90 | 90 |
|  | (A2) b-PP-2 |  |  |  |  |  |  |
|  | (A3) h-PP |  |  |  |  |  |  |
|  | (A4) HDPE |  |  |  |  |  |  |
|  | (A5) LLDPE |  |  |  |  |  |  |
|  | (A6) PP elastomer | 10 | 10 | 10 | 10 | 10 | 10 |
|  | (A7) Hydrogenated SBR |  |  |  |  |  |  |
|  | (A8) CEBC copolymer |  |  |  |  |  |  |
| (B) Phosphate compound | (B3) Melamine pyrophosphate | 30 | 30 |  |  |  |  |
|  | (B4) Melamine orthophosphate |  |  | 30 | 30 |  |  |
|  | (B5) Melamine polyphosphate |  |  |  |  | 30 | 30 |
| (C) Organic phosphorous compound | (C1) Phosphonic acid-pentaerythritol ester based flame retardant ($X^1$, $X^2$: Benzyl group (phenylmethyl group)) | 0 | 10 | 0 | 10 | 0 | 10 |
| (D) Fluorine based drip preventing agent | (D1) Modified PTFE | 2 | 2 | 2 | 2 | 2 | 2 |
| Flame retardancy | UL94 vertical burning test | Burned down (1.6 mm) | V-0 (1.6 mm) | Burned down (1.6 mm) | V-0 (1.6 mm) | Burned down (1.6 mm) | V-0 (1.6 mm) |
|  | UL94 5V test | — | 5VB | — | 5VB | — | 5VB |
| Processability | MFR (g/10 min) | 2.1 | 2.9 | 2.2 | 3.0 | 2.0 | 2.7 |
|  | MFR as a basis for calculating increase rate of MFR (g/10 min) | 2.1 (Comparative Example 41) | 2.1 (Comparative Example 41) | 2.2 (Comparative Example 42) | 2.2 (Comparative Example 42) | 2.0 (Comparative Example 43) | 2.0 (Comparative Example 43) |
|  | Increase rate of MFR (%) | 0 | 27.6 | 0 | 26.7 | 0 | 25.9 |
|  | Specific gravity | 1.02 | 1.04 | 1.02 | 1.04 | 1.02 | 1.04 |

TABLE 21

|  |  | Comparative Example 44 | Example 102 | Comparative Example 45 | Example 103 | Comparative Example 46 | Example 104 |
|---|---|---|---|---|---|---|---|
| (A) Polyolefin resin | (A1) b-PP-1 | 90 | 90 | 90 | 90 | 90 | 90 |
|  | (A2) b-PP-2 |  |  |  |  |  |  |
|  | (A3) h-PP |  |  |  |  |  |  |
|  | (A4) HDPE |  |  |  |  |  |  |
|  | (A5) LLDPE |  |  |  |  |  |  |

TABLE 21-continued

|  |  | Comparative Example 44 | Example 102 | Comparative Example 45 | Example 103 | Comparative Example 46 | Example 104 |
|---|---|---|---|---|---|---|---|
|  | (A6) PP elastomer | 10 | 10 | 10 | 10 | 10 | 10 |
|  | (A7) Hydrogenated SBR |  |  |  |  |  |  |
|  | (A8) CEBC copolymer |  |  |  |  |  |  |
| (B) Phosphate compound | (B6) Ammonium polyphosphate | 30 | 30 |  |  |  |  |
|  | (B7) Guanylurea phosphate |  |  | 30 | 30 |  |  |
|  | (B8) Melamine, melam, melem polyphosphate |  |  |  |  | 30 | 30 |
| (C) Organic phosphorous compound | (C1) Phosphonic acid-pentaerythritol ester based flame retardant ($X^1$, $X^2$: Benzyl group (phenylmethyl group)) | 0 | 10 | 0 | 10 | 0 | 10 |
| (D) Fluorine based drip preventing agent | (D1) Modified PTFE | 2 | 2 | 2 | 2 | 2 | 2 |
| Flame retardancy | UL94 vertical burning test | Burned down (1.6 mm) | V-0 (1.6 mm) | Burned down (1.6 mm) | V-0 (1.6 mm) | Burned down (1.6 mm) | V-0 (1.6 mm) |
|  | UL94 5V test | — | 5VB | — | 5VB | — | 5VB |
| Processability | MFR (g/10 min) | 2.0 | 2.9 | 1.9 | 2.8 | 2.0 | 2.7 |
|  | MFR as a basis for calculating increase rate of MFR (g/10 min) | 2.0 (Comparative Example 44) | 2.0 (Comparative Example 44) | 1.9 (Comparative Example 45) | 1.9 (Comparative Example 45) | 2.0 (Comparative Example 46) | 2.0 (Comparative Example 46) |
|  | Increase rate of MFR (%) | 0 | 27.6 | 0 | 32.1 | 0 | 25.9 |
|  | Specific gravity | 1.02 | 1.04 | 1.02 | 1.04 | 1.02 | 1.04 |

TABLE 22

| | | Comparative Example 5 | Example 37 | Example 105 | Example 106 | Example 107 | Example 108 | Example 109 | Example 110 | Example 111 | Example 112 |
|---|---|---|---|---|---|---|---|---|---|---|---|
| (A) Polyolefin resin | (A1) b-PP-1 | 90 | 90 | 90 | 90 | 90 | 90 | 90 | 90 | 90 | 90 |
| | (A6) PP elastomer | 10 | 10 | 10 | 10 | 10 | 10 | 10 | 10 | 10 | 10 |
| (B) Phosphate compound | (B1) Piperazine pyrophosphate + Melamine pyrophosphate | 30 | 30 | 30 | 30 | 30 | 30 | 30 | 30 | 30 | 30 |
| (C) Organic phosphorous compound | (C1) Phosphonic acid-pentaerythritol ester based flame retardant ($X^1$, $X^2$: Benzyl group (phenylmethyl group)) | 0 | 10 | | | | | | | | |
| | (C2) Phosphonic acid-pentaerythritol ester based flame retardant ($X^1$, $X^2$: phenylmethyl group) | | | 10 | | | | | | | |
| | (C3) Phosphonic acid-pentaerythritol ester based flame retardant ($X^1$, $X^2$: phenylproyl group) | | | | 10 | | | | | | |
| | (C4) Phosphonic acid-pentaerythritol ester based flame retardant ($X^1$, $X^2$: phenylbutyl group) | | | | | 10 | | | | | |
| | (C5) Phosphonic acid-pentaerythritol ester based flame retardant ($X^1$, $X^2$: phenylpentyl group) | | | | | | 10 | | | | |
| | (C6) Phosphonic acid-pentaerythritol ester based flame retardant ($X^1$, $X^2$: phenylisopropyl group) | | | | | | | 10 | | | |
| | (C7) Phosphonic acid-pentaerythritol ester based flame retardant ($X^1$, $X^2$: Naphthylmethyl group) | | | | | | | | 10 | | |
| | (C8) Phosphonic acid-pentaerythritol ester based flame retardant ($X^1$, $X^2$: Anthrylmethyl group) | | | | | | | | | 10 | |
| | (C9) Phosphonic acid-pentaerythritol ester based flame retardant ($X^1$: Phenylmethyl group, $X^2$: Naphthylmethyl group) | | | | | | | | | | 10 |

TABLE 22-continued

| | | Comparative Example 5 | Example 37 | Example 105 | Example 106 | Example 107 | Example 108 | Example 109 | Example 110 | Example 111 | Example 112 |
|---|---|---|---|---|---|---|---|---|---|---|---|
| (D) Fluorine based drip preventing agent | (D1) Modified PTFE | 2 | 2 | 2 | 2 | 2 | 2 | 2 | 2 | 2 | 2 |
| Flame retardancy | UL94 vertical burning test | Burned down (1.6 mm) | V-0 (1.6 mm) | V-0 (1.6 mm) | V-0 (1.6 mm) | V-0 (1.6 mm) | V-0 (1.6 mm) | V-0 (1.6 mm) | V-0 (1.6 mm) | V-0 (1.6 mm) | V-0 (1.6 mm) |
| | UL94 5V test | — | 5VA | 5VA | 5VA | 5VA | 5VA | 5VA | 5VA | 5VA | 5VA |
| Processability | MFR (g/10 min) | 2.2 | 3 | 2.9 | 2.8 | 2.8 | 2.9 | 2.8 | 2.9 | 2.9 | 2.9 |
| | MFR as a basis for calculating increase rate of MFR (g/10 min) | 2.2 | 2.2 | 2.2 | 2.2 | 2.2 | 2.2 | 2.2 | 2.2 | 2.2 | 2.2 |
| | | (Comparative Example 5) | (Comparative Example 5) | (Comparative Example 5) | (Comparative Example 5) | (Comparative Example 5) | (Comparative Example 5) | (Comparative Example 5) | (Comparative Example 5) | (Comparative Example 5) | (Comparative Example 5) |
| | Increase rate of MFR (%) | 0 | 26.7 | 24.1 | 21.4 | 21.4 | 24.1 | 21.4 | 24.1 | 24.1 | 24.1 |
| | Specific gravity | 1.02 | 1.04 | 1.04 | 1.04 | 1.04 | 1.04 | 1.04 | 1.04 | 1.04 | 1.04 |

TABLE 23

|  |  | Example 73 | Example 37 | Example 84 | Example 85 |
|---|---|---|---|---|---|
| (A)Polyolefin resin | (A1) b-PP-1 | 100 | 90 | 90 | 90 |
|  | (A2) b-PP-2 |  |  |  |  |
|  | (A3) h-PP |  |  |  |  |
|  | (A4) HDPE |  |  |  |  |
|  | (A5) LLDPE |  |  |  |  |
|  | (A6) PP elastomer |  | 10 |  |  |
|  | (A7) Hydrogenated SBR |  |  | 10 |  |
|  | (A8) CEBC copolymer |  |  |  | 10 |
| (B)Phosphate compound | (B1) Piperazine pyrophosphate + Melamine pyrophosphate | 30 | 30 | 30 | 30 |
|  | (B2) Piperazine pyrophosphate + Melamine pyrophosphate + Zinc oxide |  |  |  |  |
| (C)Organic phosphorous compound | (C1) Phosphonic acid - pentaerythritol ester based flame retardant ($X^1$, $X^2$: Benzyl group (phenylmethyl group)) | 10 | 10 | 10 | 10 |
| (D)Fluorine based drip preventing agent | (D1) Modified PTFE | 2 | 2 | 2 | 2 |
| Impact resistance | Charpy impact strength (Relative value when Charpy impact strength of Example 73 is 100) | 100 | 117 | 174 | 279 |

The flame retardant resin compositions of Examples 1 to 112 and Comparative Examples 1 to 46 obtained as described above were evaluated for flame retardancy and processability in the following manner.

<Flame Retardancy>

For seven kinds of sheets having a thickness of 0.2 mm, 0.4 mm, 0.8 mm, 1.6 mm, 3 mm, 4 mm and 5 mm obtained by performing hot pressing at 180° C. to the flame retardant resin compositions of Examples 1 to 112 and Comparative Examples 1 to 46, the UL94 vertical burning test was performed and the flame retardancy was evaluated. A grade of a sheet having the highest flame retardant grade among the seven kinds of sheets was used as the evaluation result of the flame retardancy of the Example or the Comparative Example. The results are shown in Tables 1 to 22. In addition, in Tables 1 to 22, the numerical values in parentheses indicate thicknesses of the sheets having the minimum thickness among the sheets having the same flame retardant grade. Further, in Tables 1 to 22, pass or failure criteria of flame retardancy is as follows.

Pass V-0, V-1 or V-2
Failure Burned down

In addition, for Examples in which the grades are V-0 among Examples 1 to 112, 5V test of UL94 was further performed to examine the flame retardancy difference between these Examples. The 5V test of UL94 is constituted by a strip test and a flat plate test. In the strip test, a strip test specimen (length 125 mm×width 13 mm×thickness 2 mm) was used, and in the flat plate test, a flat plate test specimen (vertical 150 mm×width 150 mm×thickness 2 mm) was used.

Examples which passed both the strip test and the flat plate test was determined to be "5VA", Examples which passed only the strip test and did not pass the flat plate test was determined to be "5VB" and Examples in which did not pass the strip test or the flat plate test was determined to be "Burned down." The results are shown in Tables 1 to 22. In addition, among Examples in which the grade is V-0, Examples determined to be "5VA" have a higher flame retardant grade than that of Examples determined to be "5VB", and Examples determined to be "5VB" have a higher flame retardant grade than that of Examples determined to be "Burned down." In Tables 1 to 22, "-" means that the 5V test of UL94 is not performed.

<Processability>

For the flame retardant resin compositions of Examples 1 to 112 and Comparative Examples 1 to 46, MFR was measured under condition of a temperature of 230° C. and a load of 2.16 kgf according to JIS K7210. Further, for each of Examples and Comparative Examples, the increase rate of MFR to the MFR of the resin composition in which the blending amount of the organic phosphorus compound (C) to 100 parts by mass of the polyolefin resin (A) is 0 part by mass was calculated based on the following formula.

Increase rate of MFR (%) = [Formula 1]

$$\left(1 - \frac{\begin{array}{c}MFR \text{ of resin composition where blending} \\ \text{amount of organic phosphorus compound} \\ (C) \text{ of each Example or Comparative} \\ \text{Example is 0 part by mass}\end{array}}{MFR \text{ of resin composition of} \atop \text{each Example of Comparative Example}}\right) \times 100$$

The results are shown in Tables 1 to 22. In addition, in Tables 1 to 22, the units of MFR are "g/10 min."

<Specific Gravity>

For flame retardant resin compositions of Examples 1 to 112 and Comparative Examples 1 to 46, specific gravity was measured by using an electronic densimeter (manufactured by Alfa Mirage Co., Ltd.). The results are shown in Tables 1 to 22.

<Impact Resistance>

For the flame retardant resin compositions of Examples 73, 37, 84 and 85, charpy impact test was performed according to JIS K 7111-1, and charpy impact strength was measured. This charpy impact strength was used as an index of impact resistance. The results are shown in Table 23. In addition, in Table 23, the charpy impact strength indicates a relative value when the charpy impact strength of Example 73 is 100. Further, when the charpy impact test is performed, rectangular parallelepiped test specimens were prepared by injection molding according to JIS K 7111-1 using the flame retardant resin compositions of Examples 73, 37, 84 and 85. At this time, a notch was formed in each of the rectangular parallelepiped test specimens by cutting. Further, the flame retardant resin composition of Example 73 is different from the flame retardant resin compositions of Examples 37, 84 and 85 in which the polyolefin resin contains an elastomer in that the polyolefin resin does not contain an elastomer, and the flame retardant resin compositions of Examples 37, 84 and 85 are different from each other in the kind of the elastomer used.

From the results shown in Tables 1 to 22, in Examples 1 to 112, the evaluation results of flame retardancy were "V-0", "V-1" or "V-2", and Examples 1 to 112 were found to meet the acceptance criteria in terms of flame retardancy. In contrast, in Comparative Examples 1 to 46, the evaluation results of flame retardancy were "Burned down," and Comparative Examples 1 to 46 were found not to meet the acceptance criteria in terms of flame retardancy.

In each of Examples 1 to 112 and Comparative Examples 25 to 28, the increase rate of MFR based on the MFR of the resin composition in which only the blending amount of the organic phosphorus compound (C) is set to 0 part by mass was a positive value and it was found that MFR was increased. In contrast, in each of Comparative Examples 1 to 24 and 29 to 46, the increase rates of MFR based on the MFR of the resin composition in which only the blending amount of the organic phosphorus compound (C) is set to 0 part by mass were 0% or less, and it was found that the MFR does not increase.

Further, from the results shown in Table 23, it has been found that the flame retardant resin composition containing an elastomer in the polyolefin resin can further improve impact resistance of the flame retardant resin composition than the flame retardant resin composition containing no elastomer in the polyolefin resin. It was also found that the flame retardant resin composition containing the olefin-ethylene-butylene-olefin copolymer can further improve impact resistance e of the flame retardant resin composition than the flame retardant resin composition which contains no olefin-ethylene-butylene-olefin copolymer in the elastomer.

From the above, according to the flame retardant resin composition of one or more embodiments, by using the phosphate compound and the organic phosphorus compound in combination, it was confirmed that the processability can be improved while securing excellent flame retardancy as compared with a case where the phosphate compound is used alone.

REFERENCE SIGNS LIST

1 Conductor
2 Insulating layer
3 Covering layer
4 Insulated wire
10 Cable
20 Optical fiber cable
24 Optical fiber
25 Covering part (insulator)

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:
1. A flame retardant resin composition, comprising:
a polyolefin resin (A);
a phosphate compound (B); and
an organic phosphorus compound (C), wherein
the phosphate compound (B) includes:
  a salt of a phosphoric acid having a structure of formula (1),

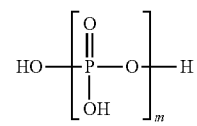

where m represents an integer of 1 to 100, and
  an amine compound containing at least one amino group in a molecule, and
the organic phosphoric compound (C) having a structure of formula (2),

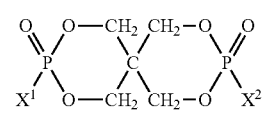

where $X^1$ and $X^2$ are same or different, and have a structure of formula (3),

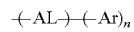

where AL is a branched or linear aliphatic hydrocarbon group having 1 to 5 carbon atoms, Ar is a phenyl group, a naphthyl group or an anthryl group which may include a substituted group, and bonds with an optional carbon atom in the AL, and n indicates an integer of 1 to 3,
  wherein the organic phosphorus compound (C) is blended in a ratio of 5 parts by mass or more and 40 parts by mass or less to 100 parts by mass of the polyolefin resin (A),
wherein the m in the formula (1) is 1 to 2,
wherein the amine compound is composed of an amine compound containing a triazine ring, a mixture of an amine compound containing a piperazine ring and an amine compound containing a triazine ring, or guanylurea, and
wherein the polyolefin resin (A) contains an elastomer and wherein the elastomer contains an olefin-ethylene-butylene-olefin copolymer.

2. The flame retardant resin composition according to claim 1, wherein the phosphate compound (B) is blended in a ratio of more than 0 part by mass and 120 parts by mass or less to 100 parts by mass of the polyolefin resin (A).

3. The flame retardant resin composition according to claim 1, wherein $X^1$ and $X^2$ in the formula (2) are benzyl groups.

4. The flame retardant resin composition according to claim 1, wherein the amine compound is composed of a mixture of an amine compound containing a piperazine ring and an amine compound containing a triazine ring.

5. The flame retardant resin composition according to claim 1, further comprising a fluorine based drip preventing agent (D).

6. The flame retardant resin composition according to claim 5, wherein the fluorine based drip preventing agent (D) is further blended in a ratio of more than 0 part by mass and 5 parts by mass or less to 100 parts by mass of the polyolefin resin (A).

7. The flame retardant resin composition according to claim 1, wherein the polyolefin resin (A) contains a polypropylene resin.

8. The flame retardant resin composition according to claim 1, wherein a content of the elastomer in the polyolefin resin (A) is 60 mass % or less.

9. The flame retardant resin composition according to claim 8, wherein the content of the elastomer in the polyolefin resin (A) is less than 40 mass %.

10. A flame retardant resin composition, comprising:
a polyolefin resin (A);
a phosphate compound (B); and
an organic phosphorus compound (C), wherein
the phosphate compound (B) includes:
a salt of a phosphoric acid having a structure of formula (1),

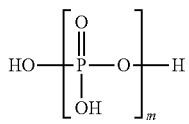
(1)

where m represents an integer of 1 to 100, and
an amine compound containing at least one amino group in a molecule,
the organic phosphoric compound (C) having a structure of formula (2),

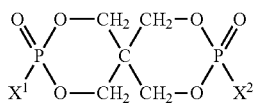
(2)

where $X^1$ and $X^2$ are same or different, and have a structure of formula (3),

(3)

where AL is a branched or linear aliphatic hydrocarbon group having 1 to 5 carbon atoms, Ar is a phenyl group, a naphthyl group or an anthryl group which may include a substituted group, and bonds with an optional carbon atom in the AL, and n indicates an integer of 1 to 3, and
wherein the polyolefin resin (A) contains an elastomer and wherein the elastomer contains an olefin-ethylene-butylene-olefin copolymer.

11. A molded body comprising the flame retardant resin composition according to claim 1.

12. An insulated wire, comprising:
a conductor; and
an insulating layer covering the conductor,
wherein the insulating layer is composed of the flame retardant resin composition according to claim 1.

13. A cable, comprising:
an insulated wire including a conductor and an insulating layer covering the conductor; and
a covering layer covering the insulated wire,
wherein at least one of the insulating layer and the covering layer is composed of the flame retardant resin composition according to claim 1.

14. An optical fiber cable, comprising:
an optical fiber; and
a covering part covering the optical fiber, wherein
the covering part includes an insulator covering the optical fiber, and
the insulator is composed of the flame retardant resin composition according to claim 1.

15. A flame retardant resin composition, comprising:
a polyolefin resin (A);
a phosphate compound (B); and
an organic phosphorus compound (C), wherein
the phosphate compound (B) includes:
a salt of a phosphoric acid having a structure of formula (1),

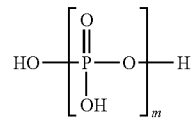
(1)

where m represents an integer of 1 to 100, and
an amine compound containing at least one amino group in a molecule, and
the organic phosphoric compound (C) having a structure of formula (2),

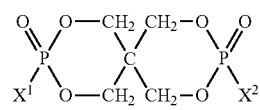
(2)

where $X^1$ and $X^2$ are same or different, and have a structure of formula (3),

(3)

where AL is a branched or linear aliphatic hydrocarbon group having 1 to 5 carbon atoms, Ar is a phenyl group, a naphthyl group or an anthryl group which may include a substituted group, and bonds with an optional carbon atom in the AL, and n indicates an integer of 1 to 3,
wherein the phosphate compound (B) is blended in a ratio of more than 0 part by mass and 30 parts by mass or less to 100 parts by mass of the polyolefin resin (A),
wherein the m in the formula (1) is 1 to 2,
wherein the amine compound is composed of an amine compound containing a triazine ring, a mixture of an amine compound containing a piperazine ring and an amine compound containing a triazine ring, or guanylurea, and
wherein the polyolefin resin (A) contains an elastomer and wherein the elastomer contains an olefin-ethylene-butylene-olefin copolymer.

* * * * *